(12) United States Patent
Sakamoto et al.

(10) Patent No.: US 7,608,130 B2
(45) Date of Patent: Oct. 27, 2009

(54) METHOD FOR PRODUCING HIGH CLEANLINESS STEEL EXCELLENT IN FATIGUE STRENGTH OR COLD WORKABILITY

(75) Inventors: Koichi Sakamoto, Kobe (JP); Tomoko Sugimura, Kobe (JP); Atsuhiko Yoshida, Kobe (JP); Yoshio Fukuzaki, Kobe (JP); Sumie Suda, Kobe (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 368 days.

(21) Appl. No.: 10/564,061

(22) PCT Filed: Dec. 17, 2004

(86) PCT No.: PCT/JP2004/018920

§ 371 (c)(1),
(2), (4) Date: Jan. 10, 2006

(87) PCT Pub. No.: WO2005/071120

PCT Pub. Date: Aug. 4, 2005

(65) Prior Publication Data

US 2006/0156864 A1    Jul. 20, 2006

(30) Foreign Application Priority Data

Jan. 22, 2004 (JP) ............................. 2004-014693
Jun. 30, 2004 (JP) ............................. 2004-193553
Oct. 1, 2004 (JP) ............................. 2004-290513

(51) Int. Cl.
    C21C 7/04    (2006.01)
    C21C 7/06    (2006.01)
(52) U.S. Cl. ........................................ 75/570; 148/320

(58) Field of Classification Search ......... 148/320–337, 148/908; 420/104, 105, 117, 118; 428/469–472.2; 75/570
See application file for complete search history.

(56) References Cited

FOREIGN PATENT DOCUMENTS

JP          50-21412          7/1975

(Continued)

OTHER PUBLICATIONS

The Iron and Steel Institute of Japan, Recent Development of Production Technology for Super-clean Wire Rod, Nishiyama Memorial Technical Lecture, pp. 147-155, with English Translation 1988.

(Continued)

Primary Examiner—Roy King
Assistant Examiner—Mark L Shevin
(74) Attorney, Agent, or Firm—Oblon, Spivak, McClelland, Maier & Neustadt, LLP

(57) ABSTRACT

The present invention relates to a high-cleanliness steel having a high fatigue strength and high cold workability, and a method of making the high-cleanliness steel. The method adds a Li—Si alloy having a Li content between 20 and 40% and/or $Li_2CO_3$ as a Li-containing substance to a molten steel. The Li-containing substance is added to the molten steel after the completion of a series of steps of a ladle refining process including composition adjustment, temperature adjustment and slag refining. The high-cleanliness steel has a total-Li content between 0.020 and 20 ppm by mass and contains 1.0 or below oxide inclusion particle having a major diameter of 20 μm or above at a maximum in 50 g of the steel wire. The steel contains an oxide inclusion that has a CaO content between 15 and 55%, $SiO_2$ content between 20 and 70%, an $Al_2O_3$ content of 35% or below, a MgO content of 20% or below and a $Li_2O$ content between 0.5 and 20%. The high-cleanliness steel has improved fatigue characteristics and improved cold workability.

21 Claims, 6 Drawing Sheets

FOREIGN PATENT DOCUMENTS

| | | | |
|---|---|---|---|
| JP | 61-84341 | | 4/1986 |
| JP | 61 084341 A | * | 4/1986 |
| JP | 63-140068 | * | 6/1988 |
| JP | 1-319623 | | 12/1989 |
| JP | 2-15111 | | 1/1990 |
| JP | 6-74484 | | 9/1994 |
| JP | 6-74485 | | 9/1994 |
| JP | 7-299586 | | 11/1995 |
| JP | 2001-26812 | | 1/2001 |
| JP | 2002-167647 | * | 6/2002 |
| JP | 2002-194497 | * | 7/2002 |
| JP | 2003-027184 | * | 1/2003 |

OTHER PUBLICATIONS

Peter Spiekermann, "Alloys—a special problem of patent law ? (T)", AIPPI, vol. 40, No. 11, XP-002445420, 1995, pp. 738-753.

Peter Spiekermann, "Legierungen —ein besonderes patentrechtliches Problem? —Legierungspruefung im Europaeischen Patentamt-", Mitteilungen der deutschen Patentanwaelte, XP-000961882, 1993, pp. 178-190.

\* cited by examiner

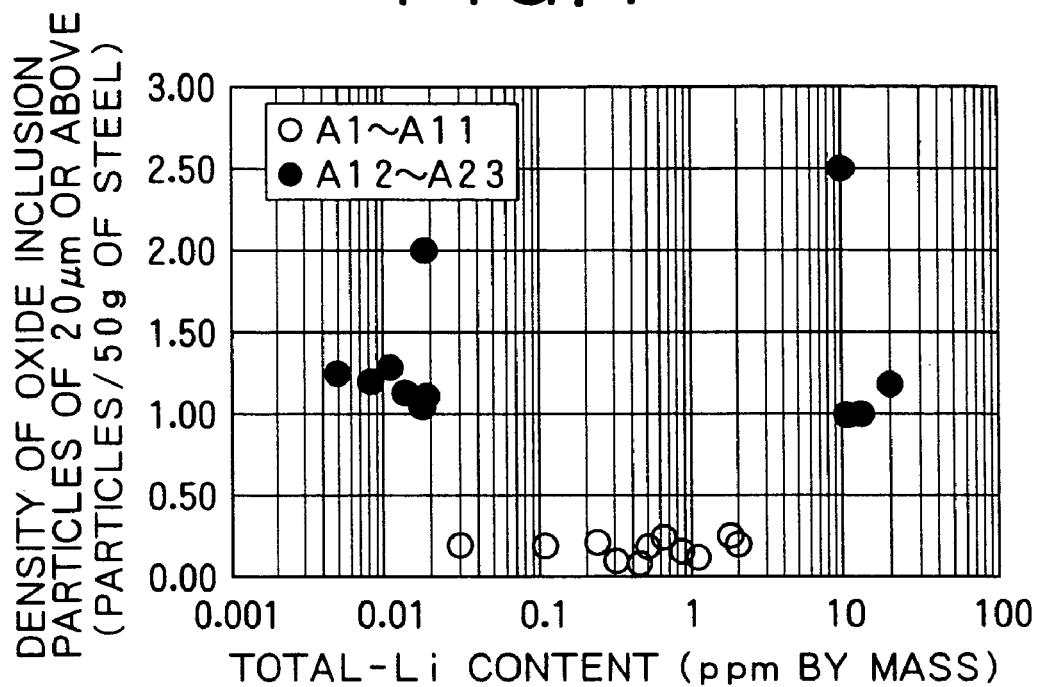
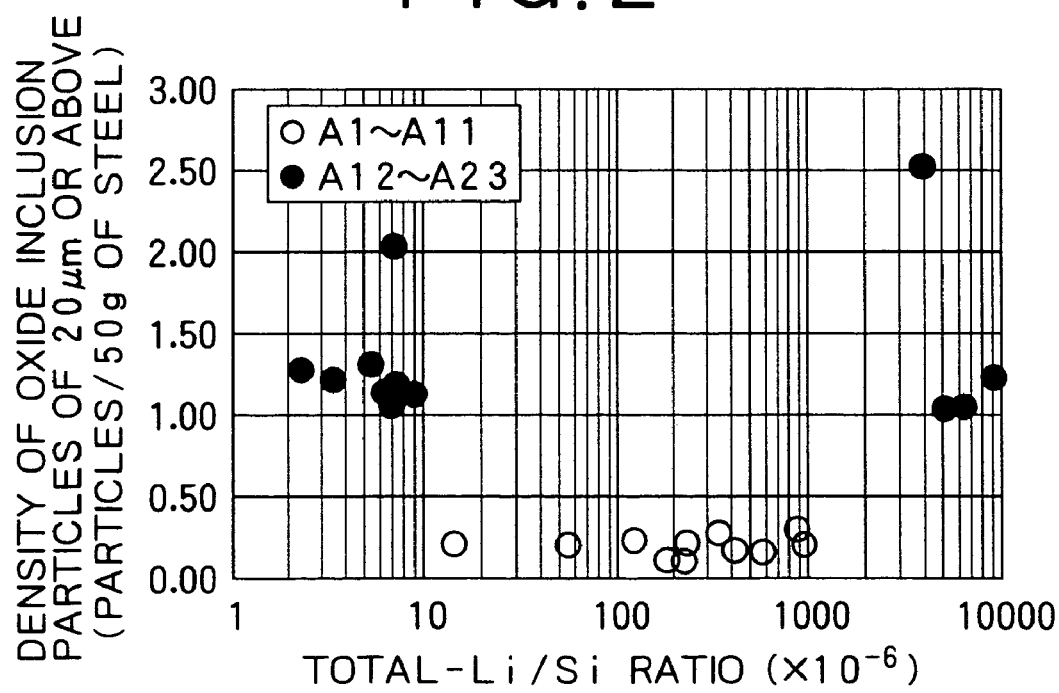

METHOD FOR PRODUCING HIGH CLEANLINESS STEEL EXCELLENT IN FATIGUE STRENGTH OR COLD WORKABILITY

TECHNICAL FIELD

The present invention relates to a method of making a high-cleanliness steel having a high fatigue strength and high cold workability and, more particularly, to a method of making a high-cleanliness steel very useful for forming high-tension steel wires, very fine steel wires and high-strength springs, particularly, valve springs.

BACKGROUND ART

It is necessary to reduce, to the least possible extent, hard nonmetallic inclusions contained in steels for forming very fine steel wires whose diameters between 0.1 and 0.5 mm made by a cold wire drawing process and springs required to have high fatigue strength. The nonmetallic inclusions cause the breakage of steel wires during wire drawing and reduction of fatigue strength. Therefore, high-cleanliness steels containing the least unavoidable nonmetallic inclusions are used for the foregoing purposes.

Demand for weight reduction and output enhancement in automobiles has been increased in recent years to reduce exhaust gases and to reduce fuel cost. Therefore, high-stress designing of valve springs included in engines, and suspension springs included in suspension systems is a recent trend of design. Thus there is a tendency to increase the strength of spring steels and to decrease the diameters of springs. Consequently, load stress becomes higher. Thus, there is a demand for high-performance steels having even more excellent characteristics resistant to fatigue and sag. Valve springs are required, in particular, to have the highest fatigue strength.

The strength of very fine steel wires represented by those forming tire cords has been progressively increased to reduce the weight of tires. Recent steel cords have a strength on the order of 4000 MPa. Since very fine steel wires having higher strength are more easily breakable during cold working (wire drawing), the improvement of cold workability of such steel wires having high strength is desired.

As mentioned above, steel springs and very fine steel wires of high-strength steels are more subject to fatigue fracture or breakage due to nonmetallic inclusions contained in the steels. Thus the severity of demand for the reduction of nonmetallic inclusion content and size has been progressively increased.

A variety of techniques have been proposed for the reduction of hard nonmetallic inclusion content and size. Results of studies of preventing fatigue fracture are introduced in, for example, "126th and 127th Nishiyama Memorial Technical Lecture", The Iron and Steel Institute of Japan, pp. 145-165, Nov. 14, 1988 (Reference 1). According to the results of studies mentioned in Reference 1, the fatigue fracture of spring steels does not occur when inclusions contained in the spring steels are those of a $CaO$—$Al_2O_3$—$SiO_2$ system having a melting point between 1400 and 1500° C., and the reduction of nonductile inclusions, such as $Al_2O_3$, contained in tire cords is effective in preventing fatigue fracture. Means for making inclusions not detrimental are proposed in JP-B 6-74484 (Reference 2) and JP-B 6-74485 (Reference 3). Means mentioned in Reference 2 shows that inclusions are fractured and dispersed and become not detrimental during cold working or wire drawing when the composition of inclusions is 20 to 60% $SiO_2$, 10 to 80% MnO, 50% or below CaO and 15% or below MgO. Means mentioned in Reference 3 shows that inclusions are fractured and dispersed and become not detrimental during cold working or wire drawing when the composition of inclusions is 35 to 75% $SiO_2$, 30% or below $Al_2O_3$, 50% or below CaO and 25% or below MgO. However, further improvement of the properties of steels is necessary to meet recent quality requirement.

A technique proposed in JP-A 1-319623 (Reference 4) makes a high-cleanliness steel by mixing a mixture of a deoxidizer of a Si system and an alkaline metal compound in a molten steel to control the composition of the product of deoxidation such that the product contains the alkaline metal. The alkaline metal decreases the melting point of hard nonmetallic inclusions of $Al_2O_3$ and $SiO_2$ systems. The hard nonmetallic inclusions having a low melting point can be extended in filaments during hot rolling and become not detrimental to the drawability and fatigue characteristics of the steel. Possible alkaline metals are Na and Li, which have the same effect. The alkaline metal singly added to the molten steel adversely affects the yield and hence it is recommended to use the alkaline metal together with the deoxidizer. For example, LiF is added together with sodium silicate to a part, in which stirring Ar bubbles appear, of the molten steel poured from a converter into a ladle at an initial stage of a ladle furnace process (LF process).

A technique proposed in JP-A 2-15111 (Reference 5) adds an alkaline metal to a molten steel to decrease the melting point of inclusions and to change the shape of inclusions during hot rolling. Possible alkaline metals are Li, Na and K, which have the same effect. Since the alkaline metal does not dissolve in the molten steel, it is recommended to use Si for dilution. More concretely, a Si alloy containing 12% or below Li is used as a deoxidizer.

A technique proposed in JP-A 2002-167647 (Reference 6) adds an alkaline metal oxide to the molten steel to improve the ductility of inclusions including $SiO_2$ as a principal inclusion. According to Reference 6, the improvement of the ductility of the inclusions is achieved by reducing the energy of interface between the inclusions and the molten iron by the alkaline metal instead of by decreasing the melting point as mentioned in References 3 and 4. In all cases, the alkaline metals Na, K and Li are thought to be equivalent. The alkaline metal content of slag is on the order of 10% at a maximum. Practically, only Na is used.

A technique proposed in JP-A 2002-194497 (Reference 7) recommends using an alkaline metal oxide for Si-deoxidation. This technique uses an alkaline metal oxide because the alkaline metal oxide is able to reduce effectively the activity of $SiO_2$ contained in ladle slag and, consequently, the oxygen content of the molten steel can be reduced. Possible alkaline oxides recommended by Reference 7 are $Na_2O$, $K_2O$ and $Li_2O$, which have the same effect. The technique proposed in Reference 7 differs from the technique proposed in Reference 5 in adding Li to the molten steel. More concretely, $Li_2O$ in the form of a carbonate is mixed in slag and the Li content of the slag is on the order of 8% at a maximum.

DISCLOSURE OF THE INVENTION

Problem to be Solved by the Invention

Under the circumstance, the present invention is achieved and its object is to provide a method of high-cleanliness steel having improved fatigue strength and improved high cold workability, and the high-cleanliness steel produced by the method.

Inventors of the present invention made studies to solve the foregoing problems and have found that Li has a particular effect unavailable from other alkaline metals, such as Na and K. Although Li is the same as Na and K in the effect of decreasing the melting point of inclusions and only Li is able to change greatly the properties of a multicomponent oxide inclusion, such as a multicomponent oxide expressed by $CaO—Al_2O_3—SiO_2—MnO—MgO$. The inventors have found that this characteristic effect of Li can be fully exhibited by adding Li to a steel by a proper method and the cold-workability and fatigue strength of the steel can be remarkably improved.

More specifically, the inventors of the present invention have found that Li can be efficiently mixed in a molten steel by adding a Li-containing substance different from conventionally used Li-containing substances to the molten steel and the properties of a multicomponent oxide inclusion can be effectively changed by Li added to the molten steel.

The techniques proposed in References 1 to 3 that adjust the composition of an inclusion of a $CaO—Al_2O_3—SiO_2$ system so that the melting point of the inclusion may be between 1400 and 1500° C. are effective in reducing the size of the inclusion particles to some extent. However, the size diminishing effect of those techniques not utilizing the crystallization promoting effect of Li is insufficient. The object of those prior art techniques is the direct control of the composition of the inclusion. To control the composition of the inclusion directly, it is important to make harmful deoxidation products produced in the molten steel, such as $SiO_2$ and $Al_2O_3$, not detrimental by mixing not detrimental slag in the molten steel during slag refining and making the slag mixed in the molten steel combine and react with the harmful products. Although this operation does not reduce the total amount of oxygen greatly, dissolved oxygen is reduced thermodynamically. Consequently, it is difficult for the harmful deoxidation products, such as $SiO_2$ and $Al_2O_3$, to develop when the molten steel solidifies. However, the molten steel and the slag must be strongly stirred to control the composition of the inclusion directly by using the reaction of the slag. Consequently, the molten steel is liable to contain inclusions originating in refractories.

Although the prior art techniques proposed in References 4 to 7 mention Li, even the techniques proposed in References 3 to 6 are unsatisfactory. For example, the technique proposed in Reference 4 uses LiF, namely, a Li-containing substance, in combination with sodium silicate. However, LiF has a melting point of 842° C. and a boiling point of 1676° C., which is close to a steel-making temperature and the adding yield is insufficient. Therefore, the technique proposed in Reference 4 needs to add LiF to a part, in which stirring Ar bubbles appear, of the molten steel poured from a converter into a ladle at an initial stage of a ladle furnace process (LF process). Even if LiF is added to the molten steel in this manner, it is difficult to add a sufficient amount of Li to the molten steel, and the Li content of the slag increases excessively. The Li content of the slag actually determined by the inventors of the present invention was as high as 4%. If the molten steel containing slag having a high Li content is stirred at the initial stage of the LF process, refractories are melted and damaged and the amount of external inclusions originating in the refractories starts increasing. Moreover, Li becomes insufficient and the inclusion diminishing effect of Li becomes insufficient. Consequently, the cold workability and fatigue characteristic of the steel cannot be sufficiently improved.

The technique proposed in Reference 5 increases Li content in slag. Since a Si—Li alloy used by the technique proposed in Reference 5 has a Li content of 12% or below, the yield of Li is low. The Li content of the slag must be high to control inclusions with such a Si—Li alloy. For example, a second embodiment adds 700 kg of a Si—Li alloy having a Li content of 2% containing 14 kg of Li to the slag of 240 t of a molten steel during refining, and a third embodiment adds a Si—Li alloy having a Li content of 5% containing 10 kg of Li to the slag of a molten steel during refining. Even though the Si—Li alloy is added in such a manner, the Li content of the steel is insufficient and the Li content of the slag is high. Experiments conducted by the inventors of the present invention showed that the $Li_2O$ content of the slag was between about 1% (second embodiment) and 1.5% (third embodiment). As mentioned in Reference 4, the melting point and viscosity of the slag decreases, the amount of melted refractories increases and external inclusions increases even if the Li content of the slag is on the order of 1%. Moreover, since the amount of Li is insufficient, the size of inclusions cannot be satisfactorily diminished. Consequently, cold workability and fatigue characteristics cannot be satisfactorily improved.

According to References 6 and 7, the Li content of the slag is very high and a maximum Li content is between 8 and 10%. When the Li content of the slag is increased to such a high level, the Li content of the steel increases to a permissible level, while the melting point and viscosity of the slag decrease considerably and refractories are melted significantly. If such a slag is produced at an initial stage of refining and is stirred strongly, refractories are damaged severely and the cold workability and fatigue characteristics of the steel are reduced greatly even if the amount of Li is sufficient.

The inventors of the present invention have found that the Li content of a molten steel can be effectively increased by adding a Si—Li alloy and/or $Li_2CO_3$ having a Li content between 20 and 40% (% by mass unless otherwise specified) as a Li-containing substance to the molten steel.

The inventors of the present invention have found that oxide inclusions originating in refractories can be controlled, the Li content of the molten steel contained in a ladle can be increased to a level not lower than a predetermined Li content and the effect of Li can be effectively exhibited when a Li-containing substance is added to a molten steel (a) after the completion of a series of steps of a ladle refining process including composition adjustment, temperature adjustment and slag refining or (b) at a final stage of a series of steps of a ladle refining process including composition adjustment, temperature adjustment and slag refining.

The inventors of the present invention have found that the properties of an oxide inclusion can be effectively changed by adding a substance containing at least one of Ca, Mg, Na and K to the molten steel in addition to the Li-containing substance.

The present invention has been made on the basis of the foregoing findings and it is an object of the present invention to provide a high-cleanliness steel having a high fatigue strength and high cold workability and a method of making the same high-cleanliness steel.

(1) A method of making a high-cleanliness steel according to the present invention adds a Li—Si alloy and/or $Li_2CO_3$ having a Li content between 20 and 40% (% by mass unless otherwise specified) to a molten steel.

(2) The method of making a high-cleanliness steel according to the present invention adds a substance containing at least one of Ca, Mg, Na and K to the molten steel in addition to the Li-containing substance.

(3) The method of making a high-cleanliness steel according to the present invention adds the Li-containing substance to the molten steel after the completion of a series of steps of a ladle refining process including composition adjustment, temperature adjustment and slag refining to control the composition of the molten steel such that the molten steel has a total-Li content between 0.020 and 20 ppm by mass and contains 1.0 or below oxide inclusion particle having a major diameter of 20 μm or above in 50 g of the steel wire.

(4) The method of making a high-cleanliness steel according to the present invention adds the Li-containing substance at a final stage of a series of steps of a ladle refining process including composition adjustment, temperature adjustment and slag refining. Thus the steel has a total-Li content between 0.020 and 20 ppm by mass and contains 1.0 or below oxide inclusion particle having a major diameter of 20 μm or above at a maximum in 50 g of the steel wire. The composition of the oxide inclusion contained in the steel can be adjusted such that the oxide inclusion has a CaO content between 15 and 55%, $SiO_2$ content between 20 and 70%, an $Al_2O_3$ content of 35% or below, a MgO content of 20% or below and a $Li_2O$ content between 0.5 and 20%.

The Li-containing substance is added to the molten steel contained in at least one of a ladle, a tundish (TD) for continuous casting and a mold (MD) for continuous casting. The Li-containing substance is added to the molten steel by an adding means, such as (1) stirring the molten steel with iron tubular wires containing the Li-containing substance or (2) blowing an inert gas carrying the Li-containing substance into the molten steel.

EFFECT OF THE INVENTION

The method of making a high-cleanliness steel of the present invention uses a proper Li-containing substance and a proper adding means to adjust the total-Li-content of the steel properly. A high-cleanliness steel made by the method of the present invention has excellent cold workability and fatigue characteristics.

The high-cleanliness steel of the present invention having a total-Li content between 0.020 and 20 ppm by mass and containing 1.0 or below oxide oxide inclusion particle having a major diameter of 20 μm or above in 50 g of the steel wire. Thus the steel has improved cold workability and fatigue characteristics.

The oxide inclusion contained in the high-cleanliness steel of the present invention is adjusted such that the oxide inclusion has a CaO content between 15 and 55%, $SiO_2$ content between 20 and 70%, an $Al_2O_3$ content of 35% or below, a MgO content of 20% or below and a $Li_2O$ content between 0.5 and 20%. Since the oxide inclusion is soft, has a low melting point and can be easily elongated and broken into pieces, the oxide inclusion will not cause fracture and breakage and the steel has improved cold workability and fatigue characteristics.

BRIEF DESCRIPTION OF THE DRAWINGS

FIG. 1 is a graph showing the relation between the Li-content of and the number of inclusion particles contained in a steel in an embodiment for forming steel cords.

FIG. 2 is a graph showing the relation between Li/Si mass ratio and the number of inclusion particles in a steel in an embodiment for forming steel cords.

BEST MODE FOR CARRYING OUT THE INVENTION

Figure 3:
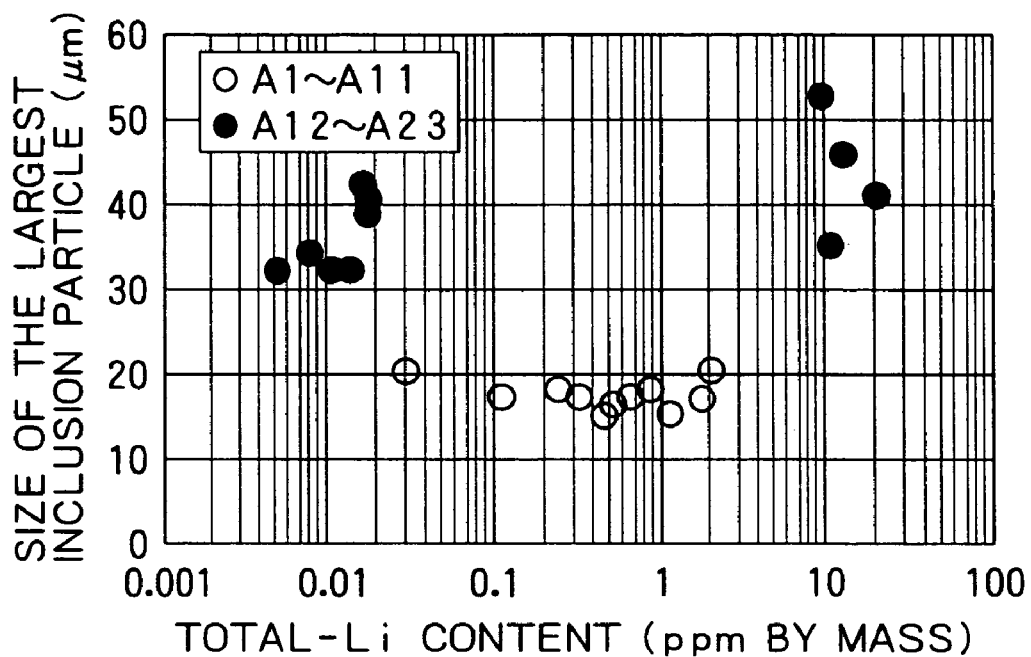
FIG. 3 is a graph showing the relation between the Li-content of and the size of the largest inclusion particle in a steel in an embodiment for forming steel cords.

High-cleanliness steels in preferred embodiments according to the present invention and methods of making those steels use Li effectively. Lithium (Li), differing from other alkaline metals, such as Na and K, is capable of remarkably changing the properties of a multicomponent oxide inclusion, such as a $CaO$—$Al_2O_3$—$SiO_2$—$MnO$—$MgO$ multicomponent oxide. In a steel making process, Li combines with a multicomponent oxide and produces a single-phase multicomponent oxide, such as a $CaO$—$Al_2O_3$—$SiO_2$—$MnO$—$MgO$—$Li_2O$ multicomponent oxide. When the steel is heated at a temperature for hot working, phase separation proceeds in the Li-containing multicomponent oxide inclusion and a vitreous phase and a crystalline phase develop in the Li-containing multicomponent oxide inclusion. Fine particles of the crystalline phase, namely, an equilibrium phase, deposit in the vitreous inclusion. When this steel is processed by blooming or hot rolling, the vitreous inclusion is highly ductile and is easily elongated because the vitreous inclusion has a low melting point and a low viscosity. On the other hand, stress is concentrated on the interface between the crystalline phase and the vitreous phase when the steel is rolled and the crystalline phase and the vitreous phase are easily separated. Consequently, the inclusion particles are deformed.

Moreover, Li, which is a strong deoxidizing element, is effective in reducing dissolved oxygen contained in the steel and reducing the quantity of the oxide. When the molten steel contains Li, the production of detrimental oxides of a $SiO_2$ system can be suppressed when the molten steel solidifies.

To make Li exercise its function effectively, Li must be efficiently added to the molten steel. A Li-containing substance, such as Li—Si alloy or $Li_2CO_3$, having a Li content between 20 and 40% is added to the molten steel.

The Li content of the Li—Si alloy is adjusted to a value between 20 and 40% to lower the liquidus temperature of the Li—Si alloy during the manufacture of the Li—Si alloy. The low liquidus temperature reduces the evaporation of Li during the manufacture of the Li—Si alloy and increases the yield of Li. Since the Li—Si alloy of the foregoing composition contains a Li—Si intermetallic compound, the yield of Li in the molten steel can be increased. Preferably, the Li content of the Li—Si alloy is between 25 and 35%. Lithium carbonate ($Li_2CO_3$) is used because $Li_2CO_3$ increases the yield of Li.

Preferably, an additional substance containing at least one of Ca, Mg, Na and K is added to the molten steel in addition to the Li-containing substance. The additional substance facilitates the combination of Li with the inclusion. However, the composition of the inclusion differs from that of a desired multicomponent oxide if an excessively large amount of those element is added to the molten steel. Therefore, the Ca, Mg, Na or K content of the molten steel must be 50 ppm at the highest. At least one of those elements may be added to the molten steel either before or after the addition of the Li-containing substance to the molten steel. Preferably, at least one of those elements is added to the molten steel together with the Li-containing substance when the Li-containing substance is added to the molten steel during a ladle refining process or at least one of those element is added to the molten steel before the Li-containing substance is added to the molten steel when the Li-containing substance is added to the molten steel after the completion of the ladle refining process.

The Li—Si alloy can be produced by premelting. When necessary, Ca, Mg or another alkaline metal, such as Na or K, may be added to the Li—Si alloy. A diluent metal, such as Fe, may be premixed with the Li—Si alloy. Moreover, Ca, Mg or an alkaline metal, such as Na or K may be added to lithium carbonate. Since the function of Li is far more excellent than those of other alkaline metals, inclusion can be satisfactorily controlled and the cold workability and fatigue strength of the steel can be satisfactorily improved even if any other alkaline metal is not added to the Li—Si alloy by premelting or mixing.

A high-cleanliness steel made by the method of the present invention has the following properties.

(1) The steel has a total-Li content between 0.020 and 20 ppm by mass and contains 1.0 or below oxide inclusion particle having a major diameter of 20 μm or above in 50 g of the steel wire.

(2) The oxide inclusion contained in the steel has a composition having a CaO content between 15 and 55%, $SiO_2$ content between 20 and 70%, an $Al_2O_3$ content of 35% or below, a MgO content of 20% or below and a $Li_2O$ content between 0.5 and 20%.

The Li-containing substance must be added to the molten steel after the completion of a series of steps of a ladle refining process including those for composition adjustment, temperature adjustment and slag refining to control the properties of the steel so as to meet conditions mentioned in (1). Since the yield of Li is high, the amount of Li contained in the steel is not lower than a predetermined amount after the completion of the ladle refining process. Since Li is not added to the molten steel (the slag) during the ladle refining process, the increase of inclusions originating in refractories can be prevented.

The Li-containing substance must be added to the molten steel in a final stage of the series of steps of a ladle refining process including composition adjustment, temperature adjustment and slag refining to control the composition of the inclusion so as to meet conditions mentioned in (2). The term "a final stage of the ladle refining processes" signifies a period in the second half of a time needed to achieve the series of steps of a ladle refining process including those for composition adjustment, temperature adjustment and slag refining. Suppose that 90 min is necessary to complete the series of steps of a ladle refining process including those for composition adjustment, temperature adjustment and slag refining. Then, the final stage is a period in the second 45 min. It is recommended that the final stage is a period in the last $1/3$ of the total time; for example, the final stage is the last 30 min when the total time is 90 min. A period preceding the final stage of the series of steps of a ladle refining process is an initial stage of the ladle refining processes.

Although Li is mixed in the molten steel when the Li-containing substance is added to the molten steel in the initial stage of the series of steps of a ladle refining process, the stirred molten steel tends to contain inclusions originating in refractories. Properties of some of those inclusions are not changed by Li and the inclusions remain in hard inclusions.

To properly control Li contained in the high-cleanliness steel having the properties mentioned in (1), indices of Li deeply related with the fineness of the inclusions must be controlled. The total-Li content of the steel mentioned in (1) and the ratio of the total-Li content to the Si content mentioned in (2), namely, total-Li/Si mass ratio can be the indices. Those indices may be individually used or may be used in combination. The total-Li/Si mass ratio is the ratio of the amount of Li to that of Si contained in the oxide the properties of which are subject to change. The Li/Si mass ratio is particularly effective in controlling the properties of Si-deoxidized steels. The total-Li content can be widely used for controlling the properties of steels other than Si-deoxidized steels.

It is recommended that the Li content of the steel is 0.020 ppm by mass or above, preferably, 0.03 ppm by mass or above, more preferably, 0.1 ppm by mass or above to make the function of Li effective. For example, the Li content may be 0.5 ppm by mass or above (for example, 1 ppm by mass or above).

The total-Li/Si mass ratio is $1\times10^{-6}$ or above, preferably, $10\times10^{-6}$ or above, more preferably, $50\times10^{-6}$ or above. For example, the Li/Si mass ratio may be $100\times10^{-6}$ or above or may be $200\times10^{-6}$ or above.

If the steel has an excessively high total-Li content, the number of particles of an oxide inclusion (hard inclusion) increases and the number of large inclusion particles increases, the cold workability of the steel deteriorates and the fatigue strength of the steel decreases. Therefore, it is desirable that the total-Li content of the steel is 20 ppm or below by mass, preferably, 9 ppm by mass or below, more preferably, 6 ppm or below. The Li/Si ratio be $1000\times10^{-6}$ or below, preferably, $800\times10^{-6}$ or below, more preferably, $600\times10^{-6}$ or below.

The high-cleanliness steel made by the method of the present invention suppresses increase in inclusions originating in refractories. For example, the molten steel contains 1.0 or below oxide inclusion particle having a major diameter of 20 μm or above at a maximum in 50 g of the steel wire, preferably, 0.8 or below oxide inclusion particles in 50 g of the steel wire, more preferably, 0.5 or below oxide inclusion particles in 50 g of the steel wire.

The cold workability, namely, drawability, and the fatigue characteristics of the steel can be improved by controlling the Li content while the inclusions originating in refractories are thus suppressed, and reducing the size of the inclusion particles.

The composition of the oxide inclusion of the foregoing properties contained in the high-cleanliness steel meeting conditions mentioned in (2) can be controlled such that the oxide inclusion is soft, has a low melting point and is easy to elongate by hot rolling. The oxide inclusion can be deformed. Thus a high-cleanliness steel excellent in cold workability and fatigue characteristics can be produced by reducing the coarse hard inclusion particles that cause fatigue fracture and breakage to the least possible extent.

It is generally known that oxides including $SiO_2$, $Al_2O_3$, CaO and MgO and multicomponent oxides contained in steels as oxide inclusions are principal substances that induce fatigue fracture and breakage of wires during wire drawing. Various techniques including those proposed in the foregoing references that improve the fatigue characteristics of steels by changing the composition of those oxide inclusions have been proposed. However, improving methods derived from those known property modifying techniques are unable to meet recent user's requirements. The inventors of the present invention made studies of various additives to modify the properties of the oxide inclusions by adding a substance to the steel instead of trying to changing the composition of the oxide inclusions inevitably contained in the steel.

The inventors found through the studies that the ductility of the oxide inclusion contained in the steel can be enhanced beyond the original ductility of the oxide inclusion by effectively utilizing $SiO_2$, $Al_2O_3$, CaO and MgO almost inevitably contained in the steel and adding a proper amount of Li to the steel and that the highly ductile oxide inclusion can be easily elongated and deformed by hot rolling, fine particles of the oxide inclusion are uniformly dispersed in the hot rolled steel and thereby the fatigue characteristics and drawability of the steel can be remarkably improved. The present invention has been made on the basis of such findings.

The present invention will be described principally in terms of reasons for determining oxide contents, i.e., percentages of oxides forming the oxide inclusion.

CaO Content: 15 to 55%

Calcium oxide (CaO) is an essential substance for softening the oxide inclusion so that the oxide inclusion may be easily deformed into small particles during a hot rolling process. The oxide inclusion having a low CaO content is a hard inclusion having a high $SiO_2$ content or a hard inclusion of a $SiO_2$—$Al_2O_3$ system. Such a hard inclusion is difficult to deform by hot rolling and is a principal substance that causes the deterioration of the fatigue characteristics and drawability of the steel. Therefore, the CaO content must be 15% or above. It is desirable that the CaO content is 20% or above, preferably 25% or above. If the CaO content of the oxide inclusion is excessively high, the oxide inclusion has a low hot deformability, becomes a hard, high-CaO inclusion and tends to cause fracture. Therefore, it is desirable that the CaO content is 50% or below, preferably, 45% or below.

$SiO_2$ Content: 20 to 70%

Silicon dioxide ($SiO_2$), as well as CaO and $Al_2O_3$, is an essential substance for producing a soft oxide inclusion having a low melting point. The oxide inclusion having a low $SiO_2$ content below 20% is a hard inclusion consisting principally of CaO and $Al_2O_3$ in large particles. Such a hard and large inclusion causes fracture. Therefore, the $SiO_2$ content must be 20% or above, preferably, 30% or above. If the $SiO_2$ content of the oxide inclusion is excessively high, the oxide inclusion is a hard inclusion principally consisting of $SiO_2$ and having a high melting point, and the tendency of the oxide inclusion to cause breakage and fracture increases. Such a tendency becomes very conspicuous when the $SiO_2$ content is 70% or above. Therefore, it is very important to limit the $SiO_2$ content to 70% or below. It is desirable that the $SiO_2$ content is 65% or below, preferably, below 45%, more preferably, 40% or below.

$Al_2O_3$ Content: 35% or Below

Aluminum oxide ($Al_2O_3$) is not an essential substance for producing a soft oxide inclusion. When the composition of the oxide inclusion is adjusted properly and the oxide inclusion has a proper $SiO_2$ content; a proper $Na_2O$ content and a proper $K_2O$ content, the oxide inclusion does not necessarily contain $Al_2O_3$. However the oxide inclusion having a proper $Al_2O_3$ content is soft and has a low melting point. Therefore, it is desirable that the $Al_2O_3$ content is 5% or above, preferably, 10% or above. If the $Al_2O_3$ content of the oxide inclusion is excessively high, the oxide inclusion is a hard inclusion of alumina system difficult to deform by hot rolling and cause fracture and breakage. Therefore, the $Al_2O_3$ content must be 35% or below, preferably, about 30% or below.

MgO Content: 20% or Below

Magnesium oxide (MgO) is a source of hard inclusion of a MgO—$SiO_2$ system and often causes fracture and breakage. Such a trouble occurs frequently when the MgO content is above 20%. Therefore, it is desirable that the MgO content is 20% or below, preferably, 15% or below.

$Li_2O$ Content: 0.5 to 20%

Lithium oxide ($Li_2O$) is the most specific and the most important component of the oxide inclusion dealt with by the present invention. Lithium oxide ($Li_2O$) lowers the melting point and viscosity of a multicomponent oxide inclusion produced in the molten steel and exercises a very important function. To promote the deformation of the oxide inclusion by lowering the melting point and viscosity of the oxide inclusion and to achieve a fatigue characteristic improving effect of a level intended by the present invention, a desirable $Li_2O$ content is 0.5% or above, preferably, 1% or above, more preferably, 2% or above. A $Li_2O$ content exceeding 20% lowers the melting point of the oxide inclusion excessively. Consequently, solubility in refractories increases remarkably, the amount of a hard inclusion originating in lining refractories increases and the fatigue characteristic and cold workability of the steel are deteriorated. Therefore the $Li_2O$ content of the oxide inclusion must be 20% or below, preferably, 15% or below.

Preferably, the oxide inclusion contains $Na_2O$ and/or $K_2O$ in addition to $Li_2O$. $Na_2O$ and $K_2O$, similarly to $Li_2O$, are substances effective in lowering the melting point and viscosity of the multicomponent oxide inclusion. Functions of $Na_2O$ and $K_2O$ can be more effectively exercised when $Na_2O$ and $K_2O$ are used in combination with $Li_2O$. This point will be explained in more detail below.

As mentioned above, $Li_2O$, $Na_2O$ and $K_2O$ have very important functions to lower the melting point and viscosity of the multicomponent oxide inclusion produced in the molten steel and to deform the multi component oxide inclusion into fine particles. Those oxides are not equivalent in function. The foregoing effect can be enhanced by making the oxide inclusions contain a proper amount of $Li_2O$ by positively adding Li having a strong deoxidizing effect as an oxide inclusion producing source to the molten steel. The inventors of the present invention found through experiments that $Li_2O$ has a function to make a vitreous oxide inclusion easily crystallizable and that this function is effective in promoting the deformation of the oxide inclusion and has a conspicuous effect on the improvement of fatigue characteristics. When a proper amount of $Li_2O$ is added to the oxide inclusion having the foregoing composition, the oxide inclusion becomes easily crystallizable and fine crystalline particles precipitates in the vitreous oxide inclusion. Consequently, load applied to the oxide inclusion during hot rolling is concentrated on boundaries each between a vitreous particle and a crystalline particle to promote the fragmentation of the oxide inclusion. Thus the hot rolled steel contains the oxide inclusion in further deformed particles. Although $Li_2O$, $Na_2O$ and $K_2O$ have considerable effect even if $Li_2O$, $Na_2O$ and $K_2O$ are added individually to the molten steel, addition of $Li_2O$ to the molten steel containing Na$_2$O and K$_2$O produces a high favorable synergistic effect on the improvement of fatigue characteristics and drawability of the steel.

Moreover, Li having a strong deoxidizing function contributes to the reduction of dissolved oxygen contained in the steel. Thus Li suppresses the production of an inclusion having a high SiO$_2$ content that precipitates when the molten steel solidifies and the growth of precipitated particles. When the molten steel solidifies, Li, Na and K contained in the molten steel produce multicomponent oxides of SiO$_2$—Li$_2$O, SiO$_2$—Na$_2$O and SiO$_2$—K$_2$O systems and a mixture of those multicomponent oxides to suppress the formation of the inclusion having a high SiO$_2$ content.

It is recommended that Li$_2$O/SiO$_2$ mass ratio, namely, the ratio in mass of Li$_2$O contained in the oxide inclusion to SiO$_2$ contained in the oxide inclusion, is within a predetermined range when Li is essential. Li$_2$O is important to lowering the melting point and viscosity of the multicomponent oxide and to promoting the deformation of the multicomponent oxide inclusion. The ratio in mass of Li$_2$O to SiO$_2$ that forms a network is important. The effect of Li$_2$O on lowering the melting point and viscosity of the multicomponent oxide inclusion multiplies when the Li$_2$O/SiO$_2$ mass ratio is sufficiently high. Thus the inclusion can be further deformed and the fracture of the steel starting from large SiO$_2$ particles can be surely prevented. If the Li$_2$O/SiO$_2$ mass ratio is excessively high, the melting point and viscosity of the multicomponent oxide inclusion are lowered, refractories are melted, hard inclusions originating in refractories increase, and the fatigue characteristics and cold workability of the steel are deteriorated. In view of the foregoing facts, it is desirable, when Li is essential, that the Li$_2$O/SiO$_2$ mass ratio is between, for example, about 0.01 (preferably, about 0.02 or above, more preferably, about 0.03 or above) and about 0.5 or below (preferably, 0.4 or below).

According to the present invention, MnO, namely, another oxide, happen to be added in the oxide inclusion. MnO is scarcely effective in causing fatigue fracture and breakage and is reduced by a strong deoxidizer, such as Ca, Al or Li. Therefore, there is not any particular limit to the MnO content of the oxide inclusion.

The high-cleanliness steel made by the method of the present invention is excellent in cold workability and fatigue characteristics. Therefore, the high-cleanliness steel can be advantageously used for forming high-tension steel wires, fine steel wires and high-strength springs, such as valve springs. A high-cleanliness steel made by the steel making method intended for such uses has a C content of 1.2% or below (preferably, between 0.1 and 1.0%, more preferably, between 0.3 and 0.9%), a Si content between 0.1 and 4% (preferably, between 0.1 and 3%, more preferably, 0.2 and 2.5%), a Mn content between 0.1 and 2% (preferably, 0.2 and 1.5%, more preferably, between 0.3 and 1.2%), a total Al content (percentage of the sum of an amount of Al contained in the steel and an amount of Al contained in the inclusion) of 0.01% or below (preferably, 0.008% or below, more preferably, 0.005% or below) and an O content of 0.005% or below (preferably, 0.004% or below, more preferably, 0.003% or below) The desirable C content of 1.2% or below is determined with an intention to use the high-cleanliness steel of the present invention for forming high-strength steel wires (C content: on the order of 1.1%) and very fine steel wires (C content: on the order of 0.01%). High-carbon steels having a C content exceeding 1.2% are excessively hard, have low workability and are practically difficult to use.

The present invention uses Li to modify the multicomponent oxide inclusion of the CaO—Al$_2$O$_3$—SiO$_2$—MnO—MgO system. In most cases, Ca and Mg contained in the multicomponent oxide inclusion are combined with the molten steel during ladle refining process through the inclusion of top slag. When necessary, Ca and Mg may be added to the molten steel. In some cases, a SiO$_2$-rich or Al$_2$O$_3$-rich secondary deoxidation product is produced when the molten steel solidifies and such a secondary deoxidation product causes troubles. In some cases, addition of Ca, Mg and Li to the molten steel is effective in preventing such troubles. The secondary deoxidation product develops from a primary inclusion or develops individually. In some cases, the inclusion generated by secondary deoxidation tend to become SiO$_2$-rich or Al$_2$O$_3$-rich as compared with that included in the molten steel of the tundish or the like. When Ca, Mg and Li are added to the molten steel, a multicomponent oxide inclusion as a secondary deoxidation product containing SiO$_2$, Al$_2$O$_3$, CaO, MgO and Li$_2$O is produced and the production of a SiO$_2$-rich or Al$_2$O$_3$-rich secondary deoxidation product can be suppressed.

A desirable total Ca content (percentage of the sum of an amount of Ca contained in the steel and an amount of Ca contained in the inclusion) is between 0.1 and 40 ppm by mass, preferably, between about 0.2 and about 25 ppm by mass), a desirable total Mg content (percentage of the sum of an amount of Mg contained in the steel and an amount of Mg contained in the inclusion) is between about 0.1 and 15 ppm by mass, preferably, between about 0.2 and about 10 ppm by mass.

When necessary, the steel may contain property improving elements, such as Cr, Ni, V, Nb, Mo, W, Cu and Ti. The steel may contain one or some of those property improving elements. Preferably, the steel has a Cr content of 3% or below, preferably, between 0.01 and 1%, a Ni content of 1% or below, preferably, between 0.05 and 0.5%, a V content of 0.5% or below, preferably, between 0.005 and 0.2%, a Nb content of 0.1% or below, preferably, between 0.005 and 0.05%, a Mo content of 1% or below, preferably, between 0.01 and 0.5%, a W content of 1% or below, preferably, between 0.01 and 0.5%, a Cu content of 2% or below, preferably, between 0.05 and 1%, a Ti content of about 0.06% or below, preferably, between 0.005 and 0.03%. Elements other than those elements may be Fe and unavoidable impurities.

A high-cleanliness steel most suitable for forming high-strength fine steel wires and high-strength valve springs contains C, Si and Mn. A high-cleanliness steel most suitable for forming, for example, high-strength fine steel wires has a C content between 0.5 and 1.2%, preferably, between 0.7 and 1.1%, a Si content between 0.1 and 0.5%, preferably, 0.15 and 0.4% and a Mn content between 0.2 and 1%, preferably, between 0.3 and 0.8%. A high-cleanliness steel most suitable for forming high-strength valve springs has a C content between 0.3 and 1.0%, preferably, between 0.4 and 0.8%, a Si content between 1 and 4%, preferably, 1.2 and 2.5% and a Mn content between 0.3 and 1.5%, preferably, between 0.4 and 1.0%.

EXAMPLE 1

The present invention will be morespecifically described in terms of examples. It is to be noted that the following are only examples, the present invention is not limited by the following examples, various changes and variations are possible therein without departing from the teaching and scope of the present invention.

Experiment 1

An experiment using actual machines (or laboratory machines) was conducted. In the experiment using actual machines, a molten steel contained in a converter was poured into a ladle (500 kg of a steel similar to that produced by a converter was made in the laboratory), various fluxes were added to the molten steel, and the molten steel was subjected to composition adjustment, electrode heating and Ar bubbling for a ladle refining process (slag refining process). When necessary, Ca and Mg were added to the molten steel. Li was added to the molten steel in $Li_2O$, $Li_2CO_3$, Li—Si alloy or LiF before the ladle refining process, at an initial stage of the ladle refining process or after the ladle refining process. Li was added to the molten steel in the ladle, in the tundish (TD) for continuous casting or in a mold (MD) for continuous casting in various adding modes respectively using tubular wires, an injection device and a dropping device. Then, blooms or ingots were made by casting the molten steel. A mold used in the laboratory experiment is equivalent in cooling rate with an actual mold. Steel wires of 5.5 mm in diameter were made by subjecting the blooms or the ingots to a bloom rolling process, a forging process and a hot rolling process. Steels of a composition suitable for forming springs and steels of a composition suitable for forming steel cords were made.

The steels were evaluated in terms of the Li content of the steel wires, the inclusion morphology and the composition of the inclusion determined through the microscopic observation of the L sections of the steel wires. The steel wires were dissolved in an acid solution to count the number and to measure the size of hard inclusion particles. The steel wires for forming springs were subjected to a rotary bending fatigue test. The steel wires for forming steel cords were subjected to wire drawing test.

Li Content of Steel

A 0.5 g of a test sample was sampled from the steel wire and the test sample was heated for hot decomposition in a mixed acid solution prepared by mixing $H_2O$, HCl and $HNO_3$ and contained in a beaker to obtain a test solution. The test solution was cooled by natural cooling. The cooled test solution was poured into a separating funnel, HCl was added to the test solution to adjust the acidity of the test solution to 9N. Methylisobutyl ketone (MIBK) was added to the test solution, the beaker containing the test solution was shook to extract iron in a MIBK phase. MIBK was added again to the test solution after removing the MIBK phase. This extracting and separating cycle was repeated three times to separate iron completely from the test solution. The 9N-hydrochloric acid acidic phase was diluted to obtain 100 ml of an alkaline test solution.

The Li (mass number 7) concentration of the alkaline test solution was measured by an ICP mass analyzer (SPQ8000, Seiko Instruments) and the Li content of the steel was calculated by using the measured Li concentration. Conditions for ICP mass analysis were as follows.

High-frequency power 1.2 kW
Flow rate of carrier gas: 0.4 l/min

Number of Oxide Inclusion Particles of 20 µm or Above in Major Diameter

Fifteen hundred grams of the test steel wire was cut into about 100 g of steel chips and the steel chips were scaled. The scaled steel chips were dissolved in a nitric acid solution of about 90° C. to obtain a test solution. The test solution was filtered by a filter having 10 µm meshes. Inclusion particles filtered out by the filter were analyzed by EPMA (electron probe microanalysis). Major diameters of oxide inclusion particles (hard inclusion particles) were measured. Large oxide inclusion particles having major diameters of 20 µm or above were counted. The number of the large oxide inclusion particles per 50 g of the steel was calculated.

Wire Drawing Test (Frequency of Breakage)

The 5.5 mm diameter steel wire formed by hot rolling was drawn into a 2.5 mm diameter steel wire by a primary drawing process. The 2.5 mm diameter steel wire was processed by a heat treatment (air patenting process). Then, the 2.5 mm diameter steel wire was drawn into a 0.8 mm diameter steel wire by a secondary drawing process. The 0.8 mm diameter steel wire was subjected to a heat treatment (lead patenting process) and was plated with brass. The brass-plated 0.8 mm diameter steel wire was drawn into a 0.15 mm diameter steel wire by a wet drawing process. The frequency of breakage of the 0.15 mm diameter wire during the wet drawing process was counted and the frequency of breakage was converted into a frequency of breakage per 10 t of the 0.15 mm diameter steel wires.

Fatigue Strength Test (Fracture Ratio)

The 5.5 mm diameter steel wire formed by hot rolling was subjected sequentially to a shaving process (SV), a low-temperature annealing process (LA), a cold drawing process (diameter: 4.0 mm), an oil tempering process (continuous tempering process for oil quenching and tempering in a lead bath at about 450° C.), a simplified stress relief annealing process (bluing process at about 400° C.), a shot peening process and a stress relief annealing process to obtain test steel wires of 4.0 mm in diameter and 650 mm in length. The fatigue strength of the test steel wires was measured by a Nakamura type rotating bending fatigue tester. Fatigue test conditions were: 940 MPa in nominal stress, 4000 to 5000 rpm in rotating speed and $2 \times 10^7$ in the number of bending cycles. The number of the test steel wires caused to fracture by the inclusions before $2 \times 10^7$ bending cycles was counted and fracture ratio was calculated by using the following expression.

(Fracture ratio) (%)=[(Number of steel wires caused to fracture by inclusion before $2 \times 10^7$ bending cycles)/{{Number of steel wires caused to fracture by inclusion before $2 \times 10^7$ bending cycles}+(Number of steel wires not fractured after $2 \times 10^7$ bending cycles)}]×100

Size of the Largest Inclusion Particle

Sections of the test steel wires caused to fracture by the inclusion during the drawing test and the fatigue strength test were observed by means of a SEM. The width of the largest inclusion particle in each of the section was measured and the composition of the largest inclusion particle was analyzed by EPMA.

Results of the foregoing tests of the test steel wires obtained by Experiment 1 are shown in Tables 1 and 2. Table 1 shows results of the wire drawing test of the test steel wires obtained by Experiment 1 simulating steel cords and Table 2 shows results of the fatigue strength test of the test steel wires obtained by Experiment 1 simulating valve springs.

TABLE 1

| Sample No. | Composition (% by mass) | | | | | | | | Li adding method | | | | | Li content of steel/ Si content of steel (% by mass) | Li$_2$O content of slag (% by mass) | Number of oxide inclusion particles of 20 μm or above (Number per 50 g of steel) | Drawability (Frequency of breakage) | Size of the largest inclusion particle (μm) |
|---|---|---|---|---|---|---|---|---|---|---|---|---|---|---|---|---|---|---|
| | C | Si | Mn | Al | Ca | Mg | O (ppm) | Li | Li-containing material | Adding time | Adding position | Adding method | | | | | | |
| A1 | 0.72 | 0.21 | 0.52 | 0.003 | 10.1 | 0.7 | 10 | 0.030 | Li$_2$CO$_3$ | After the steel melting process | Ladle | Wire | $1.43 \times 10^{-5}$ | 0.3 | 0.20 | 5 | 20 |
| A2 | 0.70 | 0.20 | 0.52 | 0.004 | 13.1 | 1.0 | 13 | 0.105 | Li$_2$CO$_3$ + Ca | After the steel melting process | Ladle | Wire | $5.25 \times 10^{-5}$ | 0.2 | 0.18 | 6 | 18 |
| A3 | 0.73 | 0.20 | 0.49 | 0.003 | 13.0 | 1.2 | 15 | 0.240 | Li$_2$CO$_3$ | After the steel melting process | Ladle | Wire | $1.20 \times 10^{-4}$ | 0.1 | 0.21 | 6 | 18 |
| A4 | 0.72 | 0.18 | 0.49 | 0.003 | 12.5 | 0.8 | 14 | 0.320 | Li$_2$CO$_3$ + Ca, Na, K | After the steel melting process | Ladle | Wire | $1.78 \times 10^{-4}$ | 0.2 | 0.10 | 2 | 17 |
| A5 | 0.83 | 0.21 | 0.52 | 0.004 | 14.5 | 0.8 | 16 | 0.460 | Li$_2$CO$_3$ | After the steel melting process | Ladle | Injection | $2.19 \times 10^{-4}$ | 0.1 | 0.09 | 0 | 15 |
| A6 | 0.83 | 0.20 | 0.50 | 0.003 | 14.1 | 2.5 | 15 | 0.665 | Li$_2$CO$_3$ + Ca, Mg | After the steel melting process | TD | Injection | $3.35 \times 10^{-4}$ | — | 0.23 | 5 | 16 |
| A7 | 0.82 | 0.22 | 0.50 | 0.003 | 15.1 | 0.9 | 15 | 0.520 | Li$_2$CO$_3$ + Ca | After the steel melting process | MD | Wire | $3.36 \times 10^{-4}$ | — | 0.18 | 1 | 16 |
| A8 | 0.82 | 0.22 | 0.51 | 0.003 | 12.1 | 1.1 | 14 | 0.870 | Li-70% Si alloy | After the steel melting process | Ladle | Injection | $3.95 \times 10^{-4}$ | 0.3 | 0.16 | 3 | 18 |
| A9 | 0.81 | 0.20 | 0.50 | 0.004 | 15.8 | 2.3 | 15 | 1.210 | Li-75% Si alloy | After the steel melting process | TD | Wire | $6.05 \times 10^{-4}$ | 0.5 | 0.13 | 5 | 15 |
| A10 | 0.83 | 0.21 | 0.52 | 0.003 | 14.1 | 2.7 | 14 | 1.750 | Li-70% Si alloy + Ca, Mg | After the steel melting process | Ladle | Wire | $8.33 \times 10^{-4}$ | 0.5 | 0.25 | 8 | 18 |
| A11 | 0.83 | 0.21 | 0.50 | 0.003 | 15.0 | 2.5 | 15 | 1.970 | Li-60% Si alloy | After the steel melting process | Ladle | Wire | $8.95 \times 10^{-4}$ | 0.6 | 0.19 | 6 | 20 |
| A12 | 0.72 | 0.21 | 0.52 | 0.003 | 23.8 | 1.8 | 24 | 13.200 | Li-70% Si alloy | Initial stage of the steel melting process | Ladle | Wire | $6.29 \times 10^{-3}$ | 1.7 | 1.02 | 48 | 45 |
| A13 | 0.73 | 0.22 | 0.52 | 0.003 | 19.8 | 1.4 | 21 | 11.200 | Li-70% Si alloy | Initial stage of the steel melting process | Ladle | Wire | $5.09 \times 10^{-3}$ | 2.6 | 1.02 | 37 | 35 |
| A14 | 0.83 | 0.22 | 0.51 | 0.003 | 24.3 | 1.7 | 25 | 20.200 | Li-70% Si alloy | Initial stage of the steel melting process | Ladle | Wire | $9.18 \times 10^{-3}$ | 4.1 | 1.20 | 60 | 41 |
| A15 | 0.83 | 0.20 | 0.51 | 0.004 | 22.9 | 3.7 | 25 | 0.018 | Li-70% Si alloy | Initial stage of the steel melting process | Ladle | Input | $9.00 \times 10^{-6}$ | 5.2 | 1.10 | 51 | 39 |
| A16 | 0.81 | 0.25 | 0.50 | 0.003 | 9.6 | 0.7 | 10 | 10 | Li$_2$O-containing slag | Initial stage of the steel melting process | Ladle | Alloy input | 0.004 | 10.0 | 2.50 | 87 | 52 |
| A17 | 0.82 | 0.25 | 0.50 | 0.003 | 14.5 | 1.4 | 18 | 0.017 | 2% Li-90% Si-0.5% Al | Initial stage of the steel melting process | Ladle | Alloy input | $6.80 \times 10^{-6}$ | 1.5 | 1.10 | 54 | 42 |
| A18 | 0.82 | 0.25 | 0.50 | 0.003 | 12.1 | 1.1 | 17 | 0.018 | 5% Li-89% | Initial stage of the steel melting process | Ladle | Input | $7.20 \times 10^{-6}$ | 1.0 | 1.05 | 51 | 39 |

TABLE 1-continued

| Sample No. | C | Si (% by mass) | Mn | Al | Ca | Mg | O (ppm) | Li | Li-containing material | Adding time | Adding position | Adding method | Li content of steel/ Si content of steel (% by mass) | Li₂O content of slag (% by mass) | Number of oxide inclusion particles of 20 μm or above (Number per 50 g of steel) | Drawability (Frequency of breakage) | Size of the largest inclusion particle (μm) |
|---|---|---|---|---|---|---|---|---|---|---|---|---|---|---|---|---|---|
| A19 | 0.73 | 0.23 | 0.52 | 0.003 | 10.4 | 1.5 | 21 | 0.008 | Si-0.1% Al LiF | steel melting process Initial stage of the steel melting process | Ladle | Input | $3.48 \times 10^{-6}$ | 1.2 | 1.20 | 56 | 34 |
| A20 | 0.72 | 0.20 | 0.52 | 0.004 | 9.2 | 1.1 | 17 | 0.011 | LiF | Initial stage of the steel melting process | Ladle | Input | $5.50 \times 10^{-6}$ | 1.6 | 1.29 | 54 | 32 |
| A21 | 0.81 | 0.19 | 0.51 | 0.004 | 8.5 | 1.0 | 16 | 0.014 | LiF | Initial stage of the steel melting process | Ladle | Input | $7.37 \times 10^{-6}$ | 1.7 | 1.14 | 49 | 32 |
| A22 | 0.82 | 0.21 | 0.51 | 0.003 | 10.1 | 1.7 | 22 | 0.005 | LiF | Initial stage of the steel melting process | Ladle | Input | $2.38 \times 10^{-6}$ | 0.0 | 1.26 | 55 | 32 |
| A23 | 0.82 | 0.25 | 0.50 | 0.003 | 9.9 | 1.6 | 20 | 0.018 | Na₂SiO₃ + LiF | Before the steel melting process | Ladle | Input | $7.20 \times 10^{-6}$ | 4.1 | 2.01 | 60 | 41 |

Figure 4:
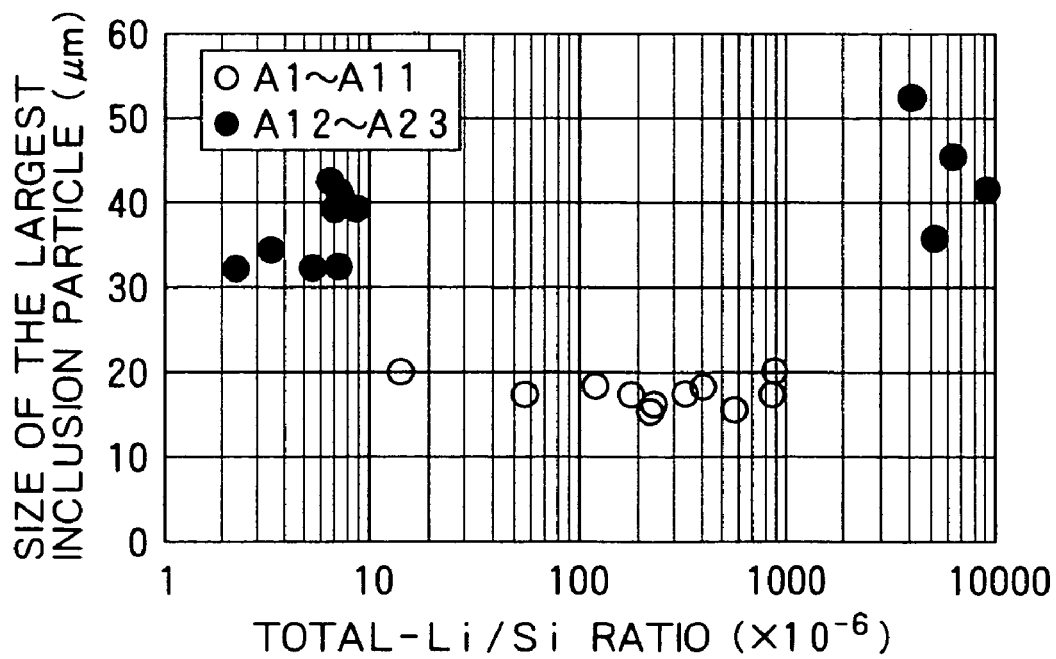
FIG. 4 is a graph showing the relation between Li/Si mass ratio and the size of the largest inclusion particle in a steel in an embodiment for forming steel cords.
Figure 5:
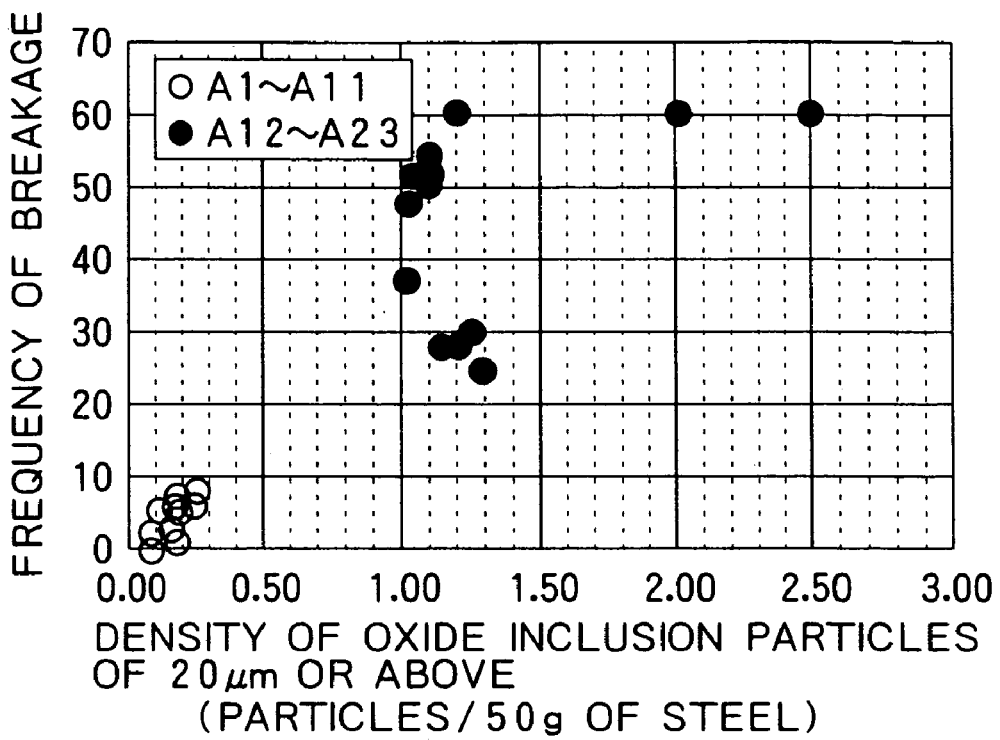
FIG. 5 is a graph showing the relation between the number of oxide inclusion particles contained in a steel and the frequency of breakage in an embodiment for forming steel cords.
Figure 6:
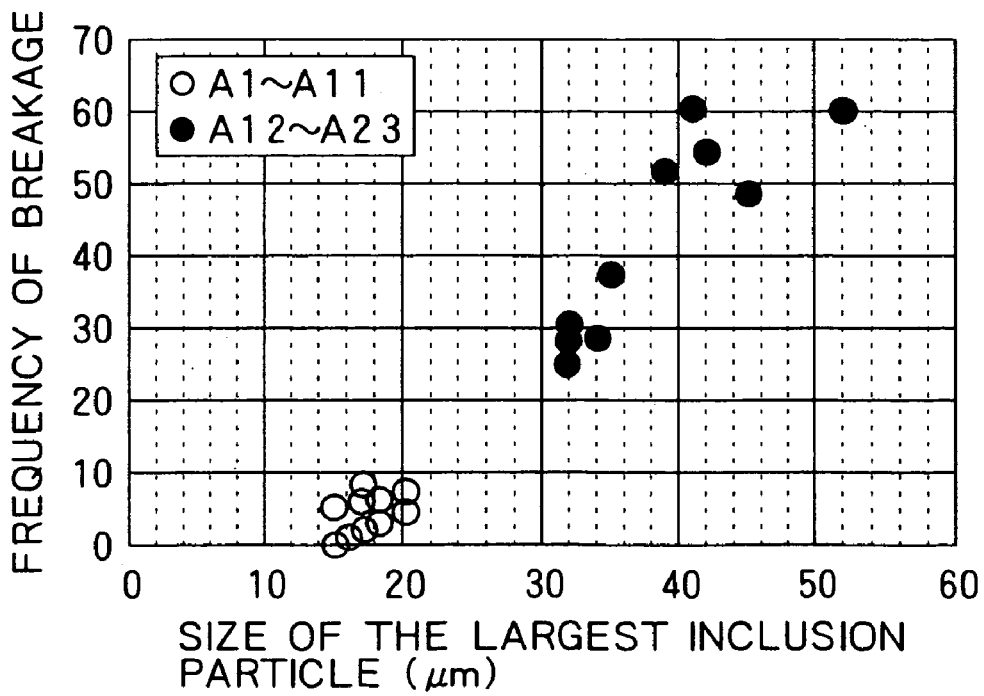
FIG. 6 is a graph showing the relation between the size of the largest inclusion particle contained in a steel and the frequency of breakage in an embodiment for forming steel cords.

Data shown in Table 1 are shown in graphs in FIGS. 1 to 6.

TABLE 2

| Sample No. | Composition (% by mass) | | | | | | | | | | | | Alkaline metal adding method | | | | Li content of steel/Si content of steel (% by mass) | Li₂O content of slag (% by mass) | Fatigue strength (Fracture ratio) (%) | Fracture causing inclusion | Size of the largest inclusion particle (μm) |
|---|---|---|---|---|---|---|---|---|---|---|---|---|---|---|---|---|---|---|---|---|---|
| | C | Si | Mn | Al | Cr | N | V | Ca | Mg | O (ppm) | Li | Li-containing material | Adding time | Adding position | Adding method | | | | | |
| B1 | 0.55 | 1.45 | 0.71 | 0.004 | 0.70 | — | — | 10.2 | 1.0 | 10 | 0.020 | Li₂CO₃ | After the steel melting process | Ladle | Wire | $1.38 \times 10^{-5}$ | 0.1 | 4 | SiO₂-rich | 15 |
| B2 | 0.55 | 1.46 | 0.70 | 0.003 | 0.71 | — | — | 18.1 | 1.4 | 18 | 0.330 | Li₂CO₃ + Ca | After the steel melting process | Ladle | Wire | $2.26 \times 10^{-5}$ | 0.1 | 0 | MgO—SiO₂ | 12 |
| B3 | 0.55 | 1.46 | 0.70 | 0.003 | 0.71 | — | — | 22.0 | 1.8 | 24 | 1.190 | Li₂CO₃ | After the steel melting process | Ladle | Wire | $8.15 \times 10^{-5}$ | 0.1 | 1 | MgO—SiO₂ | 15 |
| B4 | 0.55 | 1.46 | 0.70 | 0.003 | 0.71 | 0.25 | 0.10 | 17.3 | 3.3 | 22 | 0.624 | Li2CO3 + Ca, Mg | After the steel melting process | Ladle | Wire | $4.27 \times 10^{-5}$ | 0.2 | 0 | — | 0 |
| B5 | 0.58 | 1.45 | 0.70 | 0.004 | 0.70 | 0.25 | 0.10 | 16.1 | 4.3 | 21 | 0.986 | Li₂CO₃ | After the steel melting process | Ladle | Injection | $8.80 \times 10^{-5}$ | 0.3 | 0 | — | 0 |
| B6 | 0.60 | 1.46 | 0.70 | 0.005 | 0.70 | 0.25 | 0.10 | 20.9 | 5.1 | 21 | 0.815 | Li₂CO₃ | After the steel melting process | Ladle | Injection | $5.58 \times 10^{-5}$ | 0.4 | 2 | Al₂O₃-rich | 16 |
| B7 | 0.63 | 1.45 | 0.65 | 0.003 | 0.65 | — | 0.09 | 19.8 | 1.3 | 21 | 0.893 | Li₂CO₃ | After the steel melting process | TD | Wire | $6.16 \times 10^{-3}$ | 0.2 | 0 | — | 0 |
| B8 | 0.65 | 1.45 | 0.65 | 0.004 | 0.65 | — | 0.09 | 19.0 | 1.6 | 20 | 1.708 | Li₂CO₃ | After the steel melting process | MD | Wire | $1.18 \times 10^{-4}$ | 0.3 | 3 | CaO—SiO₂ | 13 |
| B9 | 0.63 | 1.45 | 0.65 | 0.003 | 0.65 | — | 0.09 | 24.3 | 7.5 | 25 | 5.300 | Li-70% Si alloy | After the steel melting process | Ladle | Wire | $3.66 \times 10^{-4}$ | 0.3 | 3 | Al₂O₃-rich | 15 |
| B10 | 0.64 | 1.46 | 0.64 | 0.004 | 0.65 | — | 0.09 | 23.1 | 4.1 | 22 | 13.00 | Li-70% Si alloy + Ca | After the steel melting process | Ladle | Wire | $8.90 \times 10^{-4}$ | 0.3 | 4 | Refractory base | 21 |
| B11 | 0.60 | 2.00 | 0.89 | 0.005 | 0.90 | 0.25 | 0.10 | 17.8 | 3.2 | 19 | 0.470 | Li₂CO₃ | After the steel melting process | Ladle | Wire | $2.35 \times 10^{-5}$ | 0.2 | 1 | SiO₂-rich | 20 |
| B12 | 0.61 | 2.01 | 0.90 | 0.005 | 0.90 | 0.25 | 0.10 | 17.1 | 2.8 | 19 | 3.887 | Li-70% Si alloy + Ca, Mg | After the steel melting process | Ladle | Wire | $1.93 \times 10^{-4}$ | 0.1 | 3 | Al₂O₃-rich | 16 |
| B13 | 0.61 | 2.01 | 0.90 | 0.005 | 0.90 | 0.25 | 0.10 | 15.0 | 1.1 | 15 | 0.510 | Li₂CO₃ | After the steel melting process | Ladle | Wire | $2.54 \times 10^{-5}$ | 0.2 | 2 | MgO—SiO₂ | 17 |
| B14 | 0.61 | 2.01 | 0.90 | 0.005 | 0.90 | 0.25 | 0.10 | 20.2 | 1.4 | 19 | 2.110 | Li-70% Si alloy | After the steel melting process | Ladle | Wire | $1.05 \times 10^{-4}$ | 0.3 | 2 | MgO—SiO₂ | 14 |
| B15 | 0.61 | 2.01 | 0.90 | 0.005 | 0.90 | 0.25 | 0.10 | 21.0 | 1.0 | 21 | 5.90 | Li-70% Si alloy | After the steel melting process | TD | Injection | $2.94 \times 10^{-4}$ | 0.3 | 3 | Refractory base | 19 |
| B16 | 0.61 | 2.01 | 0.90 | 0.005 | 0.90 | 0.25 | 0.10 | 20.7 | 1.6 | 22 | 8.10 | Li-70% Si alloy | After the steel melting process | Ladle | Injection | $4.03 \times 10^{-4}$ | 0.2 | 2 | Refractory base | 18 |
| B17 | 0.61 | 2.01 | 0.90 | 0.005 | 0.90 | 0.25 | 0.10 | 17.0 | 2.7 | 18 | 9.20 | Li-70% Si alloy | After the steel melting process | TD | Wire | $4.58 \times 10^{-4}$ | 0.1 | 4 | Refractory base | 19 |
| B18 | 0.61 | 2.01 | 0.90 | 0.005 | 0.90 | 0.25 | 0.10 | 38.0 | 8.8 | 30 | 19.90 | Li-70% Si alloy | After the steel melting process | MD | Wire | $9.90 \times 10^{-4}$ | 0.3 | 5 | Refractory base | 21 |

TABLE 2-continued

| Sample No. | Composition (% by mass) | | | | | | | | | Ca | Mg | O (ppm) | Li | Alkaline metal adding method | | | | Li content of steel/ Si content of steel (% by mass) | Li$_2$O content of slag (% by mass) | Fatigue strength (Fracture ratio) (%) | Fracture causing inclusion | Size of the largest inclusion particle (μm) |
|---|---|---|---|---|---|---|---|---|---|---|---|---|---|---|---|---|---|---|---|---|---|---|
| | C | Si | Mn | Al | Cr | N | V | | | | | | | Li-containing material | Adding time | Adding position | Adding method | | | | | |
| B19 | 0.58 | 1.45 | 0.71 | 0.003 | 0.71 | — | — | | | 9.1 | 0.9 | 21 | 0.009 | LiF | Initial stage of the steel melting process | Ladle | Wire | $6.21 \times 10^{-7}$ | 0.1 | 35 | SiO$_2$-rich | 38 |
| B20 | 0.55 | 1.46 | 0.73 | 0.004 | 0.70 | — | — | | | 23.2 | 4.0 | 24 | 20.20 | Li-70% Si alloy | Initial stage of the steel melting process | Ladle | Wire | $1.38 \times 10^{-3}$ | 3.0 | 46 | Refractory base | 48 |
| B21 | 0.58 | 1.45 | 0.71 | 0.003 | 0.68 | 0.25 | 0.10 | | | 8.0 | 0.7 | 17 | 0.010 | LiF | Initial stage of the steel melting process | Ladle | Wire | $6.90 \times 10^{-7}$ | 0.2 | 37 | SiO$_2$-rich | 39 |
| B22 | 0.58 | 1.46 | 0.71 | 0.004 | 0.70 | 0.25 | 0.10 | | | 19.9 | 4.0 | 21 | 2.140 | Li-70% Si alloy | Initial stage of the steel melting process | Ladle | Injection | $1.47 \times 10^{-2}$ | 7.0 | 54 | Refractory base | 48 |
| B23 | 0.63 | 1.45 | 0.65 | 0.003 | 0.65 | — | 0.09 | | | 7.2 | 0.8 | 16 | 0.018 | Li-95% Si alloy | Initial stage of the steel melting process | Ladle | Wire | $1.24 \times 10^{-8}$ | 0.3 | 39 | SiO$_2$-rich | 41 |
| B24 | 0.65 | 1.45 | 0.65 | 0.004 | 0.65 | — | 0.09 | | | 25.1 | 4.0 | 25 | 21.80 | Li-70% Si alloy | Initial stage of the steel melting process | Ladle | Wire | $1.50 \times 10^{-3}$ | 5.0 | 51 | Refractory base | 60 |
| B25 | 0.60 | 2.00 | 0.89 | 0.005 | 0.90 | 0.25 | 0.10 | | | 8 | 0.9 | 22 | 0.012 | LiF | Initial stage of the steel melting process | Ladle | Wire | $6.00 \times 10^{-7}$ | 0.2 | 45 | SiO$_2$-rich | 50 |
| B26 | 0.60 | 2.00 | 0.89 | 0.005 | 0.90 | 0.25 | 0.10 | | | 20.2 | 3.0 | 19 | 23.00 | Li-70% Si alloy | Initial stage of the steel melting process | Ladle | Wire | $1.17 \times 10^{-3}$ | 4.0 | 60 | Refractory base | 53 |

Figure 7:
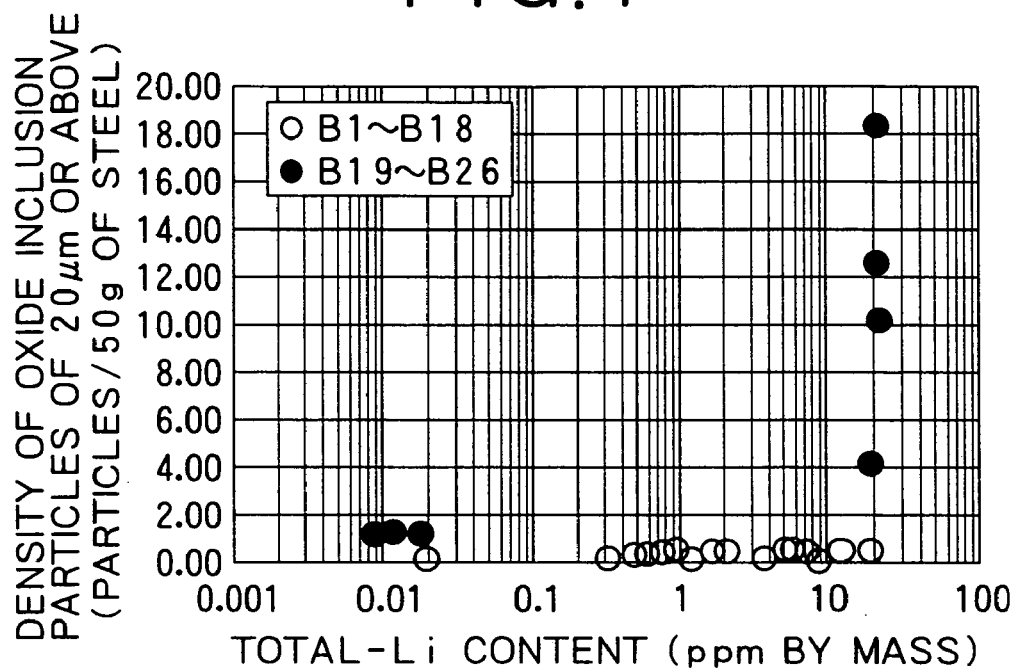
FIG. 7 is a graph showing the relation between the Li content of and the number of oxide inclusion particles in a spring steel in an embodiment for forming valve springs.
Figure 8:
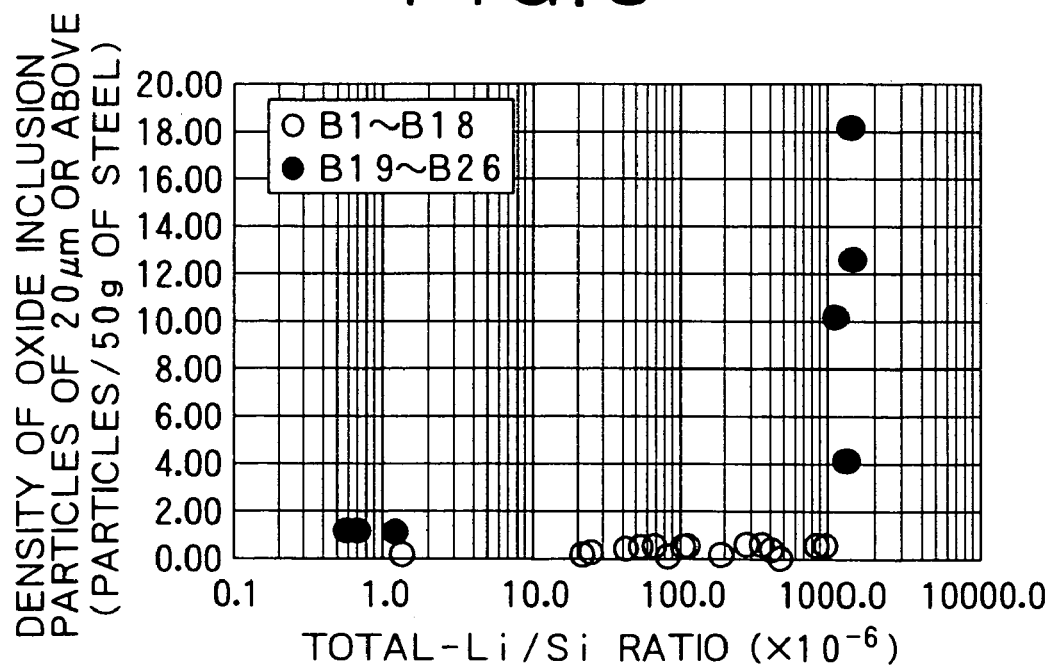
FIG. 8 is a graph showing the relation between Li/Si mass ratio and the number of oxide inclusion particles in a spring steel in an embodiment for forming valve springs.
Figure 9:
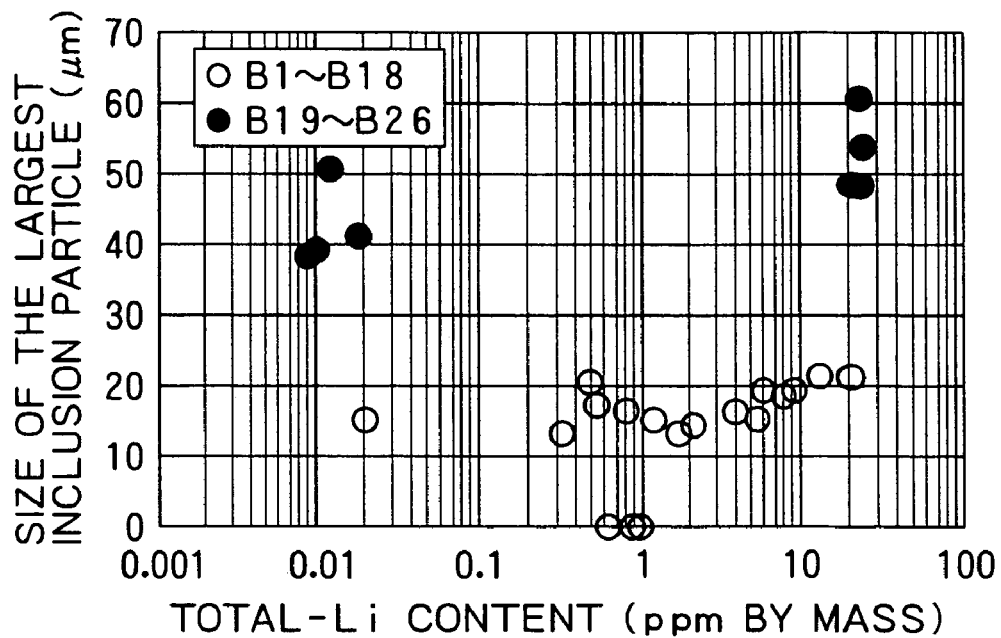
FIG. 9 is a graph showing the relation between the Li content of and the size of the largest inclusion particle in a spring steel in an embodiment for forming valve springs.
Figure 10:
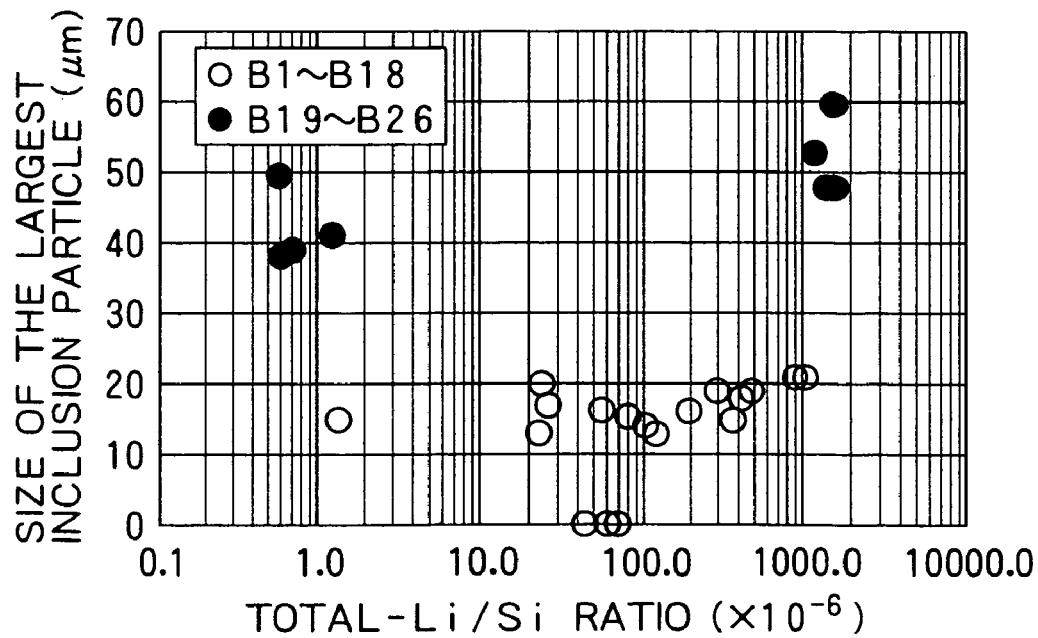
FIG. 10 is a graph showing the relation between Li/Si mass ratio and the size of the largest inclusion particle in a spring steel in an embodiment for forming valve springs.
Figure 11:
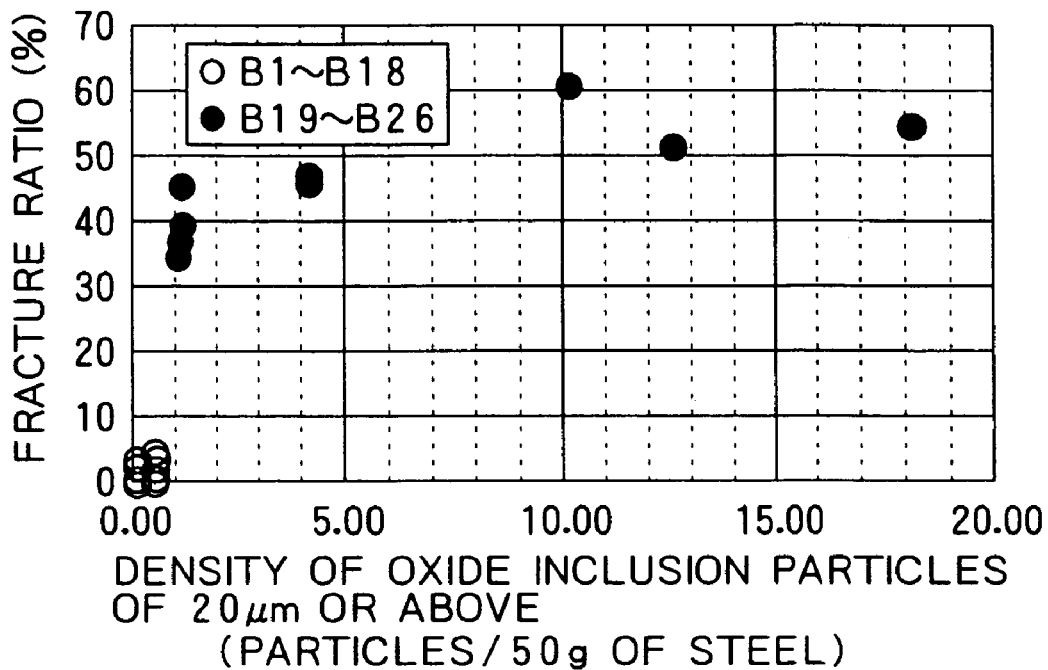
FIG. 11 is a graph showing the relation between the number of oxide inclusion particles in a spring steel and fracture ratio in an embodiment for forming valve springs.
Figure 12:
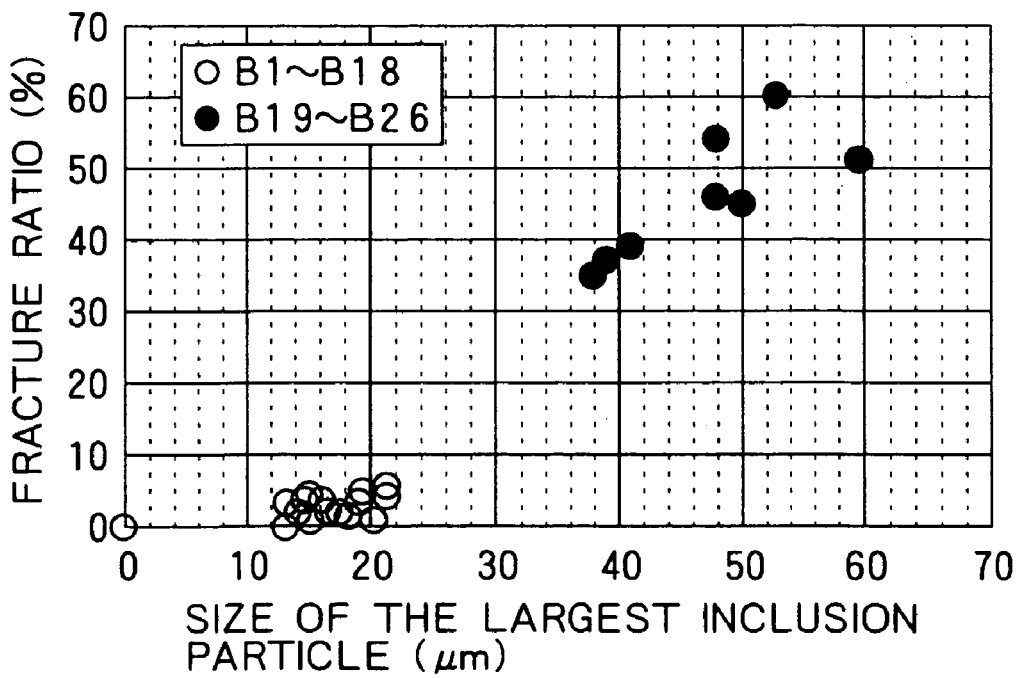
FIG. 12 is a graph showing the relation between the size of the largest inclusion particle in a spring steel and fracture ratio in an embodiment for forming valve springs.

Data shown in Table 2 are shown in graphs shown in FIGS. 7 to 12.

As obvious from the test results shown in Tables 1 and 2, when the Li is added to the steel before or at an initial stage of the ladle refining process the molten steel contains a large amount of inclusions originating in refractories when it is desired that the molten steel contains a proper amount of Li, (Sample Nos. A12 to A14, A16, B20, B22, B24 and B26) and the molten steel is unable to contain a sufficient amount of Li when it is desired to reduce inclusions originating in refractories (Sample Nos. A15, A17 to A23, B19, B21, B23 and B25). When Li is added to the molten steel after the ladle refining process to increase the yield of Li, inclusions originating in refractories can be reduced, the steel contains a proper amount of Li and the steel contains Li in a proper Li/Si ratio (Sample Nos. A1 to A11 and B1 to B18). Consequently, the inclusions can be deformed, the number of inclusion particles of 20 μm or above in major diameter and the size of the largest inclusion particle can be reduced, and the steel has improved drawability (frequency of breakage) and improved fatigue strength (fracture ratio).

EXAMPLE 2

Experiment 2

An experiment using actual 90t and 250t machines (or laboratory machines) was conducted. In the experiment using actual machines, a molten steel contained in a converter was poured into a ladle (500 kg of a steel similar to that produced by a converter was made in the laboratory), various fluxes were added to the molten steel, and the molten steel was subjected to composition adjustment, electrode heating and Ar bubbling for a ladle refining process. In a slag refining process, a Li-70% Si alloy (30% Li-70% Si alloy), Ca—Si wires, and a blend of $Li_2CO_3$, $Na_2CO_3$, $K_2CO_3$, Ca wires and Mg wires were added to the molten steel during the ladle refining process (at an initial or final stage of the ladle refining process). After the completion of the refining process, blooms or ingots were made by casting the molten steel. The laboratory experiment used a mold equivalent in cooling rate with an actual mold. Steel wires of 5.5 mm in diameter were made by subjecting the billets to a bloom rolling process or a forging process and a hot rolling process. Steels of a composition suitable for forming springs and steels of a composition suitable for forming steel cords were made.

The steels were evaluated in terms of inclusions in the inclusion morphology, and the composition of the inclusion determined through the microscopic observation of the L sections of the steel wires. The steel wires were dissolved in an acid solution to count the number and to measure the size of hard inclusion particles and to examine the composition of the hard inclusions. The steel wires for forming springs were subjected to a rotary bending fatigue test. The steel wires for forming steel cords were subjected to wire drawing test.

Inclusions Contained in Steel Wires

The L-section of a 5.5 mm diameter wire of 80 mm in length was polished and the thickness and length of inclusions were measured, the number of inclusions was counted and the composition of inclusions was analyzed.

Analysis of Composition of Inclusions

The $Li_2O$ content of the inclusion cannot be determined by EPMA. The $Li_2O$ content of the inclusion was measured by the following procedure of SIMS (secondary ion mass spectrometry)

(1) Primary Standard Sample

1) Synthetic oxides of compositions excluding $Li_2O$ and synthetic oxides of compositions including $Li_2O$ were made as standard samples. Those synthetic oxides were analyzed by chemical quantitative analysis.

2) The Li-to-Si relative secondary ionic strength of each of the synthetic oxide was measured.

3) Analytical curves of the Li-to-Si relative secondary ionic strength and the $Li_2O$ content determined by quantitative analysis in 1) were drawn.

(2) Secondary Standard Sample (Environmental Measurement Correction)

1) A standard sample was made by implanting Li ions in a Si wafer. The standard sample is used for environmental measurement correction. Li-to-Si secondary ion strength measured in (1)-2) was corrected by using the standard sample.

(3) Actual Measurement

1) The inclusion contained in the steel was analyzed by EDX and EPMA to determine the CaO, MgO, $Al_2O_3$, MnO, $SiO_2$, $Na_2O$ and $K_2O$ contents of the inclusion.

2) The Li-to-Si relative secondary ionic strength of each of the inclusion contained in the steel was measured. The analytical curve the closest to the results of analysis made in (3)-1) is selected from the analytical curves drawn in (1)-3) to determine $Li_2O$ content.

Data thus obtained are shown in Tables 3 and 4. Table 3 shows results of the wire drawing test of the test steel wires obtained by Experiment 2 simulating steel cords and Table 4 shows results of the fatigue strength test of the test steel wires obtained by Experiment 2 simulating valve springs.

TABLE 3

| Sample No. | Component content (% by mass) | | | | Composition of inclusion (% by mass) | | | | | | | |
|---|---|---|---|---|---|---|---|---|---|---|---|---|
| | C | Si | Mn | Al | CaO | $SiO_2$ | MgO | $Al_2O_3$ | $Na_2O$ | $K_2O$ | $Li_2O$ | $Na_2O + K_2O + Li_2O$ |
| A24 | 0.72 | 0.21 | 0.52 | 0.003 | 39.8 | 39.3 | 2.1 | 18.1 | 0.0 | 0.0 | 0.7 | 0.7 |
| A25 | 0.82 | 0.19 | 0.51 | 0.004 | 37.2 | 39.0 | 3.7 | 16.0 | 0.0 | 0.0 | 4.1 | 4.1 |
| A26 | 0.81 | 0.21 | 0.50 | 0.003 | 20.8 | 41.9 | 2.1 | 15.6 | 3.4 | 4.1 | 12.1 | 19.6 |
| A27 | 0.72 | 0.18 | 0.49 | 0.003 | 29.0 | 45.0 | 18.0 | 3.0 | 0.0 | 1.0 | 3.0 | 4.0 |
| A28 | 0.72 | 0.21 | 0.52 | 0.004 | 15.0 | 47.4 | 9.2 | 16.0 | 2.3 | 0.0 | 10.1 | 12.4 |
| A29 | 0.83 | 0.19 | 0.50 | 0.003 | 20.1 | 63.1 | 1.8 | 8.0 | 0.5 | 2.6 | 3.9 | 7.0 |
| A30 | 0.84 | 0.20 | 0.48 | 0.003 | 26.4 | 32.0 | 2.5 | 34.0 | 0.0 | 0.0 | 5.1 | 5.1 |
| A31 | 0.70 | 0.18 | 0.49 | 0.003 | 30.0 | 58.0 | 1.6 | 10.0 | 0.0 | 0.0 | 0.4 | 0.4 |

TABLE 3-continued

| | | | | | | | | | | | | |
|---|---|---|---|---|---|---|---|---|---|---|---|---|
| A32 | 0.73 | 0.20 | 0.51 | 0.003 | 25.0 | 39.0 | 1.0 | 14.0 | 0.0 | 0.0 | 21.0 | 21.0 |
| A33 | 0.73 | 0.21 | 0.50 | 0.004 | 52.2 | 25.0 | 2.2 | 16.6 | 1.0 | 0.0 | 0.0 | 1.0 |
| A34 | 0.74 | 0.20 | 0.50 | 0.003 | 40.6 | 61.0 | 2.5 | 21.3 | 0.0 | 1.2 | 0.0 | 1.2 |
| A35 | 0.81 | 0.19 | 0.52 | 0.003 | 28.7 | 31.0 | 3.4 | 36.0 | 0.0 | 0.0 | 0.9 | 0.9 |
| A36 | 0.83 | 0.20 | 0.49 | 0.004 | 11.0 | 50.7 | 20.5 | 16.2 | 0.6 | 0.0 | 1.0 | 1.6 |
| A37 | 0.83 | 0.20 | 0.50 | 0.003 | 15.0 | 71.0 | 3.9 | 8.1 | 0.5 | 0.4 | 1.1 | 2.0 |
| A38 | 0.83 | 0.19 | 0.51 | 0.004 | 45.0 | 18.0 | 2.6 | 33.4 | 0.0 | 0.4 | 0.6 | 1.0 |

| Sample No. | Li adding method | | Number of oxide inclusion particles of 20 μm or above (Number per 50 g of steel) | Drawability (Frequency of breakage) | Size of the largest inclusion particle (μm) |
|---|---|---|---|---|---|
| | Li-containing material | Adding time | | | |
| A24 | $Li_2CO_3$ | Final stage of the steel melting process | 0.20 | 10 | 22 |
| A25 | Li-70% Si alloy | Final stage of the steel melting process | 0.10 | 5 | 19 |
| A26 | Li-70% Si alloy | Final stage of the steel melting process | 0.09 | 2 | 17 |
| A27 | Li-70% Si alloy | Final stage of the steel melting process | 0.16 | 6 | 20 |
| A28 | Li-70% Si alloy | Final stage of the steel melting process | 0.13 | 7 | 18 |
| A29 | Li-70% Si alloy | Final stage of the steel melting process | 0.19 | 11 | 22 |
| A30 | Li-70% Si alloy | Final stage of the steel melting process | 0.21 | 9 | 21 |
| A31 | $Li_2CO_3$ | Initial stage of the steel melting process | 0.80 | 31 | 32 |
| A32 | Li-70% Si alloy | Initial stage of the steel melting process | 0.55 | 28 | 41 |
| A33 | — | — | 0.67 | 35 | 45 |
| A34 | — | — | 0.45 | 40 | 36 |
| A35 | $Li_2CO_3$ | Initial stage of the steel melting process | 0.38 | 24 | 31 |
| A36 | $Li_2CO_3$ | Initial stage of the steel melting process | 0.54 | 46 | 37 |
| A37 | $Li_2CO_3$ | Initial stage of the steel melting process | 0.93 | 58 | 39 |
| A38 | $Li_2CO_3$ | Initial stage of the steel melting process | 0.41 | 22 | 32 |

TABLE 4

| Sample No. | Component content (% by mass) | | | | | | | | Composition of inclusion (% by mass) | | | | | | | Li adding method | | Fracture ratio (%) | Inclusion causative of fracture | Size of the largest inclusion particle (μm) |
|---|---|---|---|---|---|---|---|---|---|---|---|---|---|---|---|---|---|---|---|---|
| | C | Si | Mn | Al | Cr | Ni | V | | CaO | $SiO_2$ | MgO | $Al_2O_3$ | $Na_2O$ | $K_2O$ | $Li_2O$ | $Na_2O + K_2O + Li_2O$ | Adding position | Adding time | | | |
| B27 | 0.55 | 1.45 | 0.71 | 0.004 | 0.70 | — | — | | 35.0 | 42.7 | 2.9 | 18.8 | 0.0 | 0.0 | 0.6 | 0.6 | $Li_2CO_3$ | Final stage of the steel melting process | 18 | $MgO—SiO_2$ | 25 |
| B28 | 0.50 | 1.48 | 0.70 | 0.003 | 0.71 | 0.25 | 0.10 | | 35.2 | 40.5 | 2.7 | 18.0 | 0.0 | 1.0 | 2.6 | 3.6 | $Li_2CO_3$ | Final stage of the steel melting process | 0 | — | — |
| B29 | 0.58 | 1.45 | 0.74 | 0.004 | 0.70 | 0.25 | 0.10 | | 25.6 | 41.5 | 17.3 | 10.2 | 1.2 | 0.0 | 4.2 | 5.4 | $Li_2CO_3$ | Final stage of the steel melting process | 0 | — | — |
| B30 | 0.60 | 1.40 | 0.70 | 0.040 | 0.70 | 0.25 | 0.10 | | 22.4 | 37.8 | 2.4 | 33.8 | 0.0 | 0.0 | 3.8 | 3.6 | $Li_2CO_3$ | Final stage of the steel melting process | 8 | $Al_2O_3$-rich | 16 |
| B31 | 0.63 | 1.45 | 0.65 | 0.003 | 0.65 | — | 0.09 | | 21.2 | 40.2 | 2.5 | 28.6 | 2.1 | 1.5 | 3.9 | 7.5 | $Li_2CO_3$ | Final stage of the steel melting process | 0 | — | 0 |
| B32 | 0.65 | 1.45 | 0.65 | 0.064 | 0.05 | — | 0.09 | | 36.3 | 46.0 | 5.6 | 4.9 | 0.0 | 0.0 | 7.2 | 7.2 | Li-70% Si alloy | Final stage of the steel melting process | 3 | $CaO—SiO_2$ | 13 |
| B33 | 0.60 | 2.06 | 0.00 | 0.005 | 0.00 | 0.25 | 0.10 | | 18.0 | 69.8 | 2.8 | 7.2 | 0.0 | 0.0 | 2.2 | 2.2 | $Li_2CO_3$ | Final stage of the steel melting process | 18 | $SiO_2$-rich | 25 |
| B34 | 0.60 | 2.01 | 0.00 | 0.005 | 0.00 | 0.25 | 0.10 | | 15.1 | 45.0 | 2.2 | 19.5 | 0.0 | 0.0 | 18.2 | 18.2 | Li-70% Si alloy | Final stage of the steel melting process | 5 | $Al_2O_3$-rich | 18 |
| B35 | 0.55 | 1.44 | 0.69 | 0.003 | 0.70 | — | — | | 21.5 | 60.3 | 2.9 | 13.2 | 0.0 | 0.0 | 2.1 | 2.1 | $Li_2CO_3$ | Final stage of the steel melting process | 0 | — | 18 |
| B36 | 0.56 | 1.46 | 0.70 | 0.003 | 0.71 | 0.25 | 0.10 | | 20.3 | 65.2 | 2.4 | 10.2 | 0.0 | 0.0 | 1.9 | 1.9 | $Li_2CO_3$ | Final stage of the steel melting process | 3 | $MgO—SiO_2$ | 19 |
| B37 | 0.63 | 1.45 | 0.65 | 0.003 | 0.65 | — | 0.08 | | 20.2 | 63.8 | 2.9 | 7.2 | 0.0 | 0.0 | 5.9 | 5.9 | Li-70% Si alloy | Final stage of the steel melting process | 0 | — | 16 |
| B38 | 0.00 | 2.00 | 0.69 | 0.005 | 6.90 | 0.25 | 0.10 | | 19.0 | 62.5 | 2.8 | 9.2 | 0.0 | 0.0 | 6.5 | 6.5 | Li-70% Si alloy | Final stage of the steel melting process | 0 | — | 0 |
| B39 | 0.50 | 1.45 | 0.71 | 0.003 | 0.71 | — | — | | 19.2 | 64.8 | 2.4 | 13.2 | 0.0 | 0.0 | 0.4 | 0.4 | $Li_2CO_3$ | Initial stage of the steel melting process | 35 | $SiO_2$-rich | 32 |
| B40 | 0.55 | 1.40 | 0.73 | 0.004 | 0.70 | — | — | | 20.9 | 43.1 | 2.5 | 12.3 | 0.0 | 0.0 | 21.2 | 21.2 | Li-70% Si alloy | Initial stage of the steel melting process | 75 | Refractory base | 48 |
| B41 | 0.55 | 1.40 | 0.68 | 0.005 | 0.70 | — | — | | 15.0 | 45.0 | 2.3 | 16.2 | 2.5 | 1.2 | 17.8 | 17.8 | Li-70% Si alloy | Initial stage of the steel melting process | 89 | Refractory base | 67 |
| B42 | 0.50 | 1.45 | 0.71 | 0.003 | 6.60 | 0.25 | 0.1 | | 55.9 | 32.6 | 2.1 | 8.4 | 0.0 | 0.0 | 1.0 | 1.0 | $Li_2CO_3$ | Initial stage of the steel melting process | 35 | $CaO—SiO_2$ | 35 |
| B43 | 0.50 | 1.40 | 0.71 | 0.004 | 0.70 | 0.25 | 0.1 | | 14.0 | 62.3 | 1.9 | 21.0 | 0.0 | 0.0 | 0.8 | 0.8 | $Li_2CO_3$ | Initial stage of the steel melting process | 46 | $SiO_2$-rich | 43 |
| B44 | 0.55 | 1.60 | 0.71 | 0.003 | 0.70 | — | — | | 22.4 | 39.7 | 1.7 | 35.1 | 0.0 | 0.0 | 1.1 | 1.1 | $Li_2CO_3$ | Initial stage of the steel melting process | 36 | $Al_2O_3$-rich | 30 |
| B45 | 0.63 | 1.45 | 0.65 | 0.003 | 0.65 | — | — | | 29.2 | 30.0 | 1.5 | 36.0 | 0.0 | 0.0 | 1.3 | 1.3 | $Li_2CO_3$ | Initial stage of the steel melting process | 35 | $Al_2O_3$-rich | 34 |
| B46 | 0.65 | 0.45 | 0.65 | 0.004 | 0.65 | — | 0.09 | | 16.4 | 53.1 | 20.1 | 9.3 | 0.0 | 0.0 | 1.1 | 1.1 | $Li_2CO_3$ | Initial stage of the steel melting process | 51 | $MgO—SiO_2$ | 32 |
| B47 | 0.61 | 2.01 | 0.90 | 0.005 | 0.00 | 0.25 | — | | 16.0 | 71.8 | 2.7 | 8.6 | 0.0 | 0.0 | 0.9 | 0.9 | $Li_2CO_3$ | Initial stage of the steel melting process | 66 | $SiO_2$-rich | 45 |
| B48 | 0.60 | 2.00 | 0.89 | 0.005 | 0.96 | 0.25 | 0.1 | | 53.5 | 16.9 | 2.9 | 23.7 | 0.0 | 0.0 | 1.0 | 1.0 | $Li_2CO_3$ | Initial stage of the steel melting process | 38 | $CaO—SiO_2$ | 48 |

As obvious from data on steel wires for forming steel cords shown in Table 3, the number of large inclusion particles of 20 μm or above is small, the size of the largest inclusion particle is small and the frequency of breakage of the wires during the wire drawing process is small when Li is added to the molten steel at a final stage of the ladle refining process (Samples Nos. A24 to A30). It is known from Table 3 that the frequency of breakage of the steel wires made of steels containing 0.3 or fewer large hard inclusion particles of 20 μm or above per 50 g of steel is obviously low.

The composition of inclusions contained in the steel wires does not conform to a composition specified by the present invention and the frequency of breakage per 10 t of the steel is greater than twenty times and the number of large hard inclusion particles of 20 μm or above is high when Li is added to the molten steel at an initial stage of the ladle refining process (Samples Nos. A31 to A38).

As obvious from data on the steel wires for forming valve springs shown in Table 4, the fracture ratios of the steel wires of sample Nos. B27 to B38 meeting all the requirements of the present invention are relatively low and the size of the largest inclusion particle contained therein is small.

The steel wires of sample Nos. B39 to B48 not meeting the requirements of the present invention, which are comparative examples, have relatively high fracture ratios and the size of the largest inclusion particle contained therein is large.

INDUSTRIAL APPLICABILITY

The method of making a high-cleanliness steel according to the present invention capable of making a high-cleanliness steel excellent in cold workability and fatigue characteristics can be advantageously applied to making steels for forming high-tension steel wires, very fine steel wires and high-strength springs, such as valve springs.

The invention claimed is:

1. A high-cleanliness steel having a total-Li content between 0.020 and 9 ppm by mass and containing 1.0 or below of oxide inclusion particles having a major diameter of 20 μm or above in 50 g of the steel.

2. The high-cleanliness steel according to claim 1, wherein the total-Li/Si mass ratio representing the ratio in mass of the total amount of Li contained in the steel to the amount of Si contained in the steel is between $1 \times 10^{-6}$ and $1000 \times 10^{-6}$.

3. The high-cleanliness steel according to claim 1, wherein each of the oxide inclusion particles has a CaO content between 15 and 55% by mass, a $SiO_2$ content between 20 and 70% by mass, an $Al_2O_3$ content of 35% by mass or below, a MgO content of 20% by mass or below and a $Li_2O$ content between 0.5 and 20% by mass.

4. The high-cleanliness steel according to claim 3, wherein each of the oxide inclusion particles has a $Li_2O/SiO_2$ mass ratio between 0.01 and 0.5.

5. The high-cleanliness steel according to claim 3, wherein each of the oxide inclusion particles has a $SiO_2$ content of 30% by mass or above and below 45% by mass.

6. The high-cleanliness steel according to claim 3, wherein each of the oxide inclusion particles contains $Na_2O$ and/or $K_2O$ and the sum of $Li_2O$ content, $Na_2O$ content and $K_2O$ content is between 0.5 and 20% by mass.

7. The high-cleanliness steel according to claim 1, wherein the steel has a C content of 1.2% by mass or below, a Si content between 0.1 and 4% by mass, a Mn content between 0.1 and 2.0% by mass, and an Al content of 0.01% by mass or below.

8. The high-cleanliness steel according to claim 7, wherein the steel has an O content of 0.005% by mass or below, a total-Mg content between 0.1 and 15 ppm by mass and a total-Ca content between 0.1 and 40 ppm by mass.

9. The high-cleanliness steel according to claim 7, wherein the steel contains at least one of Cr, Ni, V, Nb, W, Cu and Ti.

10. The high-cleanliness steel according to claim 7, wherein the other elements of the steel are Fe and unavoidable impurities.

11. The high-cleanliness steel according to claim 8, wherein the steel contains at least one of Cr, Ni, V, Nb, W, Cu and Ti.

12. The high-cleanliness steel according to claim 8, wherein the other elements of the steel are Fe and unavoidable impurities.

13. The high-cleanliness steel according to claim 9, wherein the other elements of the steel are Fe and unavoidable impurities.

14. The high-cleanliness steel according to claim 1, wherein the steel has a total-Li content between 0.020 and 6 ppm by mass.

15. A method of making a high-cleanliness steel excellent in cold workability and fatigue characteristic, said method comprising
adding a Li-containing substance selected from the group consisting of a Li—Si alloy, $Li_2CO_3$, and a combination thereof, having a Li content between 20 and 40 % by mass, to a molten steel; and
producing the steel of claim 1.

16. The method of making a high-cleanliness steel according to claim 15, characterized by adding a substance containing at least one of Ca, Mg, Na and K to the molten steel in addition to the Li-containing substance.

17. The method of making a high-cleanliness steel according to claim 15, characterized by adding the Li-containing substance to the molten steel after the completion of a series of operations of a ladle refining process including composition adjustment, temperature adjustment and slag refining to control the composition of the molten steel such that the steel has a total-Li content between 0.020 and 9 ppm by mass and contains 1.0 or below of oxide inclusion particles having a major diameter of 20 μm or above in 50 g of the steel.

18. The method of making a high-cleanliness steel according to claim 15, characterized by adding the Li-containing substance at a final stage of a series of operations of a ladle refining process including composition adjustment, temperature adjustment and slag refining such that an oxide inclusion contained in the steel has a CaO content between 15 and 55% by mass, a $SiO_2$ content between 20 and 70% by mass, an $Al_2O_3$ content of 35% by mass or below, a MgO content of 20% by mass of below and a $Li_2O$ content between 0.5 and 20% by mass.

19. The method of making a high-cleanliness steel according to claim 15, characterized by adding the Li-containing substance to the molten steel contained in at least one of a ladle, a tundish for continuous casting, and a mold for continuous casting.

20. The method of making a high-cleanliness steel according to claim 15, characterized by adding the Li-containing substance to the molten steel by stirring the molten steel with iron tubular wires containing the Li-containing substance.

21. The method of making a high-cleanliness steel according to claim 15, characterized by adding the Li-containing substance to the molten steel by blowing an inert gas carrying the Li-containing substance into the molten steel.

* * * * *

UNITED STATES PATENT AND TRADEMARK OFFICE
CERTIFICATE OF CORRECTION

| | | |
|---|---|---|
| PATENT NO. | : 7,608,130 B2 | Page 1 of 1 |
| APPLICATION NO. | : 10/564061 | |
| DATED | : October 27, 2009 | |
| INVENTOR(S) | : Sakamoto et al. | |

It is certified that error appears in the above-identified patent and that said Letters Patent is hereby corrected as shown below:

On the Title Page

Item [*] Notice: Subject to any disclaimer, the term of this patent is extended or adjusted under 35 U.S.C. 154(b) by 368 days Delete the phrase "by 368 days" and insert -- by 657 days --

Signed and Sealed this

First Day of June, 2010

David J. Kappos
*Director of the United States Patent and Trademark Office*